(12) United States Patent
Kubokawa et al.

(10) Patent No.: US 8,176,799 B2
(45) Date of Patent: May 15, 2012

(54) STATE MEASURING APPARATUS FOR ROLLING BEARING UNIT AND METHOD OF MANUFACTURING THE SAME

(75) Inventors: Minoru Kubokawa, Kanagawa (JP); Masayuki Maruyama, Kanagawa (JP)

(73) Assignee: NSK Ltd., Tokyo (JP)

( * ) Notice: Subject to any disclaimer, the term of this patent is extended or adjusted under 35 U.S.C. 154(b) by 269 days.

(21) Appl. No.: 12/601,465

(22) PCT Filed: May 23, 2008

(86) PCT No.: PCT/JP2008/059573
§ 371 (c)(1),
(2), (4) Date: Jun. 1, 2010

(87) PCT Pub. No.: WO2008/143349
PCT Pub. Date: Nov. 27, 2008

(65) Prior Publication Data
US 2010/0162831 A1    Jul. 1, 2010

(30) Foreign Application Priority Data

May 23, 2007  (JP) .............. P2007-136236
Nov. 8, 2007  (JP) .............. P2007-290888
May 7, 2008   (JP) .............. P2008-121269

(51) Int. Cl.
*G01L 3/14* (2006.01)
(52) U.S. Cl. .............................. 73/862.322
(58) Field of Classification Search .......... 73/862.322
See application file for complete search history.

(56) References Cited

U.S. PATENT DOCUMENTS 7,320,257 B2 * 1/2008 Takizawa et al. ........ 73/862.541
7,501,811 B2 * 3/2009 Ono .................... 324/207.25

FOREIGN PATENT DOCUMENTS

| JP | 2004-198210 A | 7/2004 |
| JP | 2006-113017 A | 4/2006 |
| JP | 2006-266278 A | 10/2006 |
| JP | 2006-317420 A | 11/2006 |
| JP | 2007-093580 A | 4/2007 |
| JP | 2008-064731 A | 3/2008 |

OTHER PUBLICATIONS

International Search Report (PCT/ISA/210) dated Jun. 17, 2008 in PCT/JP2008/059573.
International Preliminary Examination Report (PCT/ISA/237) dated Jun. 17, 2008 in PCT/JP2008/059573.

* cited by examiner

*Primary Examiner* — Lisa Caputo
*Assistant Examiner* — Octavia Davis-Hollington
(74) *Attorney, Agent, or Firm* — Sughrue Mion, PLLC

(57) ABSTRACT

The sensor holder has an annular portion that holds the sensors. A holding ring that is securely fitted in an inner peripheral surface of a cylinder portion constituting a cover made of metal in terms of a large tight fit is embedded in an intermediate portion of this annular portion in the axial direction. A portion of a folded portion of the holding ring in the axial direction is set in a just center position between axial positions of sensing portions of both sensors. According to this configuration, the above problem is solved by preventing such a situation that the thermal expansion or the thermal contraction yields a phase difference between the output signals of both sensors.

18 Claims, 22 Drawing Sheets

OUTPUT OF SENSOR 6a

OUTPUT OF SENSOR 6b

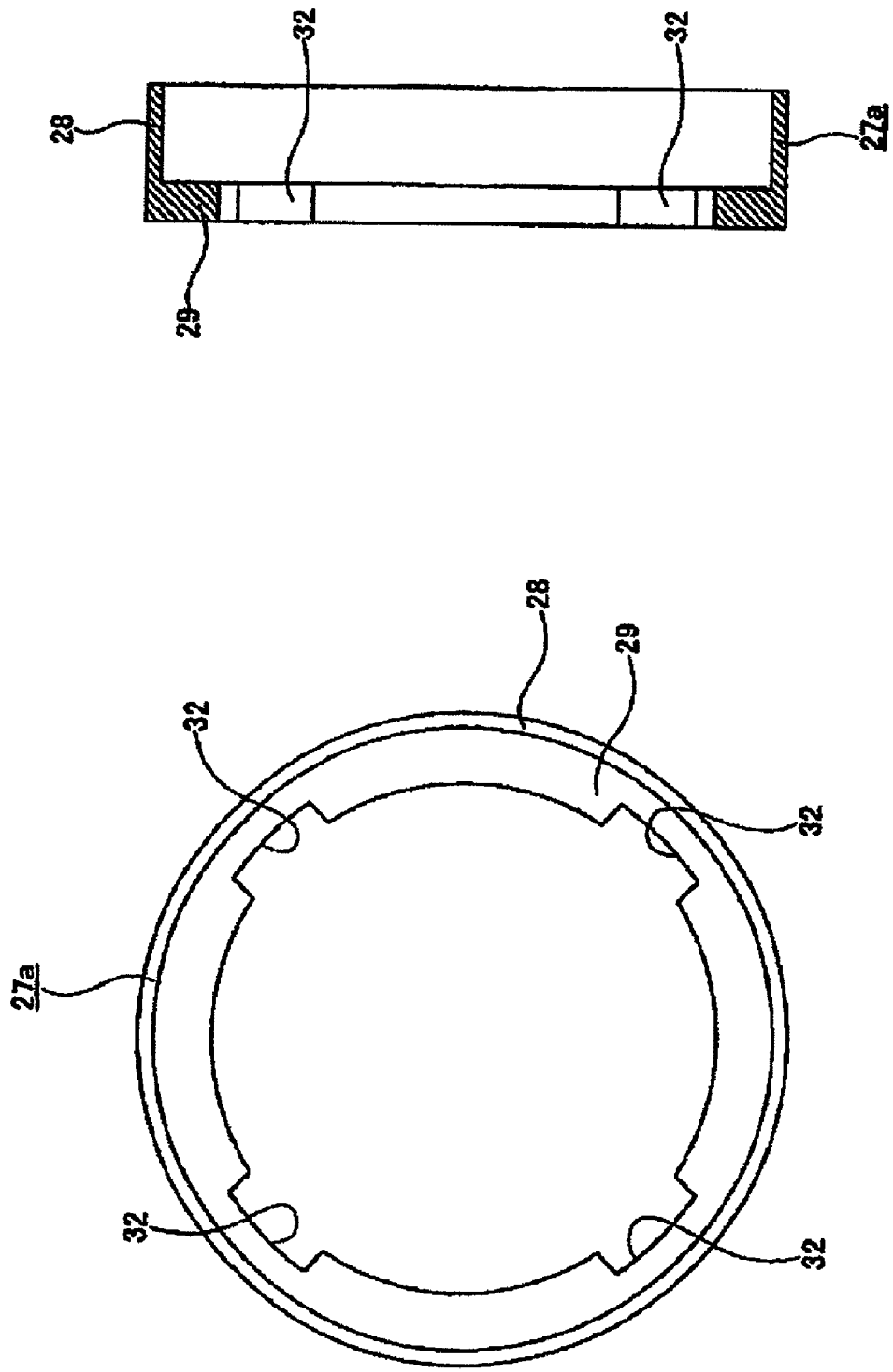

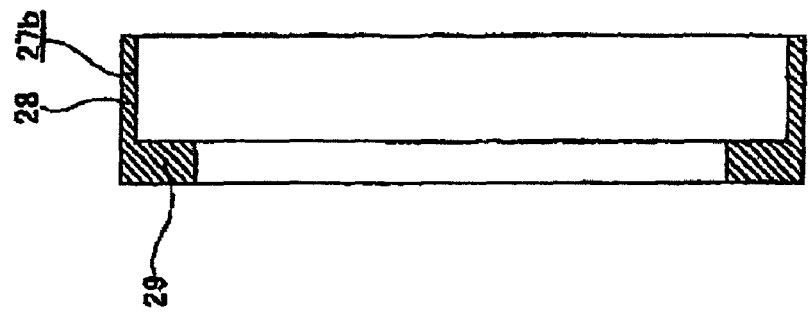
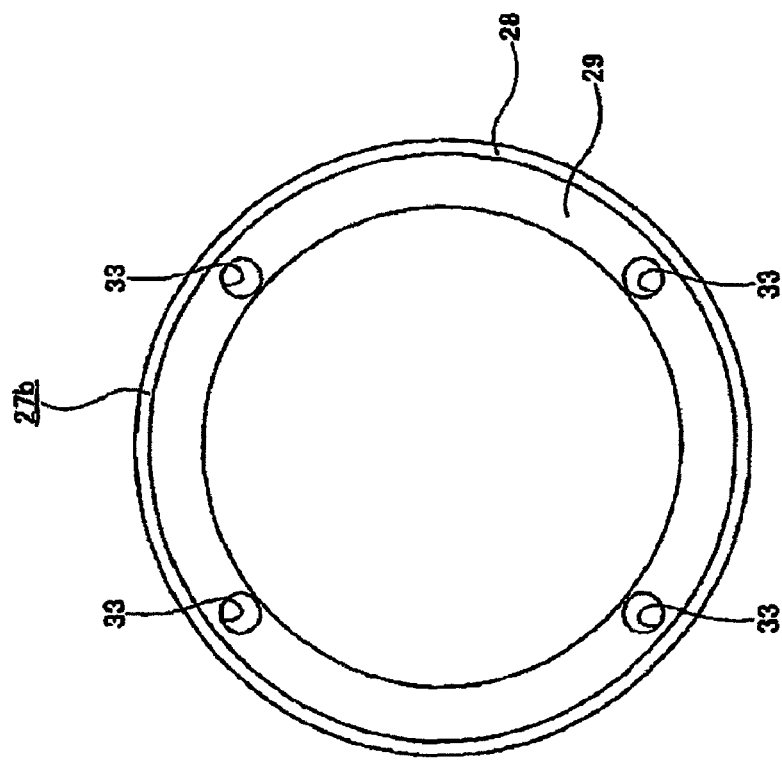

OUTPUT OF SENSOR 6a

OUTPUT OF SENSOR 6b

STATE MEASURING APPARATUS FOR ROLLING BEARING UNIT AND METHOD OF MANUFACTURING THE SAME

TECHNICAL FIELD

A state measuring apparatus for a rolling bearing unit according to this present invention is utilized to measure a status variable such as an external force acting between an outer ring and a hub constituting the rolling bearing unit, or the like. Also, this state measuring apparatus for the rolling bearing unit utilizes this measured status variable to ensure running stability of vehicles such as automobiles.

BACKGROUND ART

For example, a wheel of an automobile is rotatably supported to a suspension device by a double row angular contact rolling bearing unit, or the like. Also, in order to ensure the running stability of the vehicle, for example, not only an anti-lock brake system (ABS) or a traction control system (TCS) but also a vehicle running stabilizing unit such as an electronic vehicle stability control system (ESC), or the like is employed. In order to control such vehicle running stabilizing unit, signals indicating a rotation speed of a wheel, accelerations applied to an automobile body in respective directions, and the like are required. Also, in order to apply the higher control, it is preferable in some cases that a magnitude of a load (one or both of a radial load and an axial load, for example) applied to the rolling bearing unit via the wheel should be known.

In view of such circumstances, in Patent Literature 1, the invention that measures a magnitude of a load applied to the rolling bearing unit by using a special encoder is set forth. FIGS. 14 to 16 show a first example of the conventional structure concerning a state measuring apparatus for a rolling bearing unit, in which the same load measuring principle as the structure set forth in Patent Literature 1 is employed. In this first example of the conventional structure, a hub 2 is supported rotatably on the inner diameter side of an outer ring 1 via a plurality of rolling elements 3, 3 such that the hub 2 is rotated together with a wheel while this hub attaches the wheel in use and also the outer ring 1 is not rotated in use. A contact angle of back-to-back arrangement type and also a preload are applied to these rolling elements 3, 3. In this case, balls are employed as the rolling elements 3, 3 in the illustrated example, but sometimes tapered rollers are employed in place of the balls in the case of a bearing unit for automobile whose weight is increased.

Also, a cylindrical encoder 4 is attached to an inner end portion of the hub 2 (the term "inner" in an axial direction denotes a center side in a width direction of an automobile in a fitted status to the automobile, i.e., rightward side in FIGS. 1, 2, 7 to 12, 14, 17, 18, 20, 24. In contrast, the term "outer" in the axial direction denotes the outward side in the width direction of the automobile in a fitted status to the automobile, i.e., leftward side in FIGS. 1, 2, 7 to 12, 14, 17, 18, 20, 24. Ditto with the recitation throughout this specification) concentrically with the hub 2. Also, a sensor holder 7 containing a pair of sensors 6a, 6b therein is held on an inner side of a cylindrical cover 5 with a bottom, which blocks an inner end opening of the outer ring 1. Also, sensing portions of these sensors 6a, 6b are opposed closely to outer peripheral surfaces of the encoder 4 acting as sensed surfaces.

This encoder 4 is made of a magnetic metal plate. Through holes 8, 8 and column portions 9, 9 (see FIG. 15) are arranged in a circumferential direction alternately at an equal interval in the front half portion (the inner half portion in the axial direction) of the outer peripheral surface of the encoder 4, which act as the sensed surface. The boundaries between the through holes 8, 8 and the column portions 9, 9 are inclined by the same angle to the axial direction (the width direction) of the sensed surface respectively, and also the inclination angles to the axial direction are set to the opposite direction mutually at the boundary located in an intermediate portion of the sensed surface in the axial direction. Accordingly, the through holes 8, 8 and the column portions 9, 9 constitute a "V"-shape, the intermediate portion of which in the axial direction protrudes mostly in the circumferential direction, respectively. Then, out of outer half portions in the axial direction and inner half portions in the axial direction of the sensed surface, in which the inclination directions at the boundaries are different mutually, the outer half portion in the axial direction is denoted as a first characteristic changing portion 10, and the inner half portion in the axial direction is denoted as a second characteristic changing portion 11. In this case, respective through holes constituting both characteristic changing portion 10, 11 may be formed either in a state that they are formed continuously mutually, as illustrated, or in a state that they are formed individually mutually (respective through holes may be arranged like almost V shapes whose intersection points are located discretely).

Also, the cover 5 is made of a metal plate such as a stainless steel plate, or the like and shaped as a whole into a cylinder with a bottom, and is fitted in and fixed to the inner end portion of the outer ring 1. This cover 5 has a cylinder portion 12 whose outer end portion is securely fitted to the inner end portion of the outer ring 1 (in the illustrated example, fitted into the inner end portion as the tight fitting), and a bottom plate portion 13 blocking an inner end opening of the cylinder portion 12. Also, the sensor holder 7 is made of a synthetic resin and is shaped as a whole into a cylinder with a bottom. The sensor holder 7 is equipped with a cylinder portion 14 for holding both sensors 6a, 6b, and a bottom plate portion 15 for blocking an inner end opening of the cylinder portion 14 and holding a sensor circuit (not shown). Such sensor holder 7 is formed by molding a synthetic resin in the cover 5 by means of injection molding (mold forming) or by fitting the sensor holder 7, which is formed previously by the injection molding, into the cover 5 and then fixing the sensor holder 7 to the cover 5 by adhesive 16. When the sensor holder 7 is fixed by the adhesive 16, the cylinder portion 14 is fitted into the cylinder portion 12 of the cover 5 without play, and a side surface of the bottom plate portion 15 (right side surface in FIG. 14) of the sensor holder 7 is fixed to a side surface of the bottom plate portion 13 (left side surface in FIG. 14) of the cover 5 by the adhesive 16.

Also, a pair of sensors 6a, 6b are constructed by a permanent magnet, and a magnetic sensing element such as Hall IC, Hall element, MR element, GMR element, or the like constituting a sensing portion respectively. A sensing portion of one sensor 6a is opposed closely to the first characteristic changing portion 10 and a sensing portion of the other sensor 6b is opposed closely to the second characteristic changing portion 11 in a state that a pair of sensors 6a, 6b are embedded integrally in a part of the cylinder portion 14 constituting the sensor holder 7 in the circumferential direction (for example, the lower end portion). The positions where the sensing portions of both sensors 6a, 6b are opposed to both characteristic changing portions 10, 11 respectively are set to the same positions of the encoder 4 in the circumferential direction. Also, the setting positions of respective members are restricted such that mostly projected portions of the through holes 8, 8 and the column portions 9, 9 in the circumferential direction at the intermediate portion in the axial direction (portions at which the inclination direction of the boundary is changed) are located just in the center positions between the sensing portions of both sensors 6a, 6b in a neutral status that no axial load is applied between the outer ring 1 and the hub 2.

In the case of the state measuring apparatus for the rolling bearing unit constructed as above, when the axial load is applied between the outer ring 1 and the hub 2 (the outer ring 1 and the hub 2 are relatively displaced in the axial direction), phases in which output signals of both sensors 6a, 6b are changed are shifted. That is, the sensing portions of both sensors 6a, 6b are opposed to portions on solid lines a, a in (A) of FIG. 16, i.e., portions that are deviated from the mostly projected portion to the same extent in the axial direction respectively, in a neutral status that no axial load is applied between the outer ring 1 and the hub 2. Therefore, phases of the output signals of both sensors 6a, 6b coincide with each other, as shown in (C) of FIG. 16.

In contrast, when the axial load is applied downward in (A) of FIG. 16 to the hub 2 to which the encoder 4 is fixed, the sensing portions of both sensors 6a, 6b are opposed to portions on broken lines b, b in (A) of FIG. 16, i.e., portions that are deviated from the mostly projected portion to the different extent in the axial direction respectively. In this status, phases of the output signals of both sensors 6a, 6b are shifted differently, as shown in (B) of FIG. 16. Then, when the axial load is applied upward in (A) of FIG. 16 to the hub 2 to which the encoder 4 is fixed, the sensing portions of both sensors 6a, 6b are opposed to portions on chain lines c, c in (A) of FIG. 16, i.e., portions whose deviations from the mostly projected portion in the axial direction are mutually different in the opposite direction respectively. In this status, phases of the output signals of both sensors 6a, 6b are shifted in the opposite direction to that in above (B), as shown in (D) of FIG. 16.

As described above, in the case of the state measuring apparatus for the rolling bearing unit known in the prior art and as set forth in Patent Literature 1, etc., phases of the output signals of both sensors 6a, 6b are shifted in the direction that responds to the acting direction (the relatively displacing direction between the outer ring 1 and the hub 2 in the axial direction) of the axial load applied between the outer ring 1 and the hub 2. Also, the extent to which the phases of the output signals of both sensors 6a, 6b are shifted by the axial load (relative displacement) is increased as the axial load (relative displacement) is increased much more. As a result, a direction and a magnitude of the relative displacement in the axial direction and an acting direction and a magnitude of the axial load, which are a status variable between the outer ring 1 and the hub 2 respectively, can be derived based on whether or not the phases of the output signals of both sensors 6a, 6b are shifted and the direction and a magnitude of the phase shifts when the phase shifts are present. In this case, processes of calculating such status variables are executed by a calculator (not shown). For this purpose, relations between a phase difference and the relative displacement in the axial direction or the load, which are examined in advance by theoretical calculations and experiments, are stored in a memory of this calculator in a form of relational expressions and maps.

In the case of the above first example of the conventional structure, the through holes 8, 8 and the column portions 9, 9 are arranged alternately on the sensed surface of the encoder 4, and the characteristic of the sensed surface are changed alternately at an equal interval. In contrast, as shown in FIG. 17, the state measuring apparatus for the rolling bearing unit equipped with an encoder 4a made of a permanent magnet in which the S pole and the N pole are arranged alternately on the outer peripheral surface as the sensed surface is set forth in Patent Literature 2 and is known in the prior art. The basic structure and action of the state measuring apparatus for the rolling bearing unit shown in FIG. 17 are similar to those in the above first example of the conventional structure shown in FIGS. 14 to 16. In the case of the second example of the conventional structure shown in FIG. 17, a permanent magnet is provided on the encoder 4a side, and hence a magnetic sensing element may be provided in principle on the sensors 6a, 6b side, and the permanent magnet is not needed. Also, in the case of the structure shown in FIG. 17, a hub main body constituting a hub 2a and an inner ring are coupled by a caulking portion that is formed on an inner end portion of the hub main body in the axial direction, instead of the nuts shown in FIG. 14. However, such structure is well known in the prior art and does not constitute a gist of the present invention.

Also, in Patent Literature 3, a state measuring apparatus for a rolling bearing unit as shown in FIGS. 18 to 21 are set forth. First, in the third example of the conventional structure shown in FIGS. 18 and 19, slit-like through holes 8a, 8a and column portions 9a, 9a (see FIG. 19) are arranged alternately at an equal interval in the circumferential direction in the front half portion of a cylindrical encoder 4b, which is made of a magnetic metal plate and is securely fitted to the inner end portion of the hub 2. Boundaries between the through holes 8a, 8a and the column portions 9a, 9a are inclined linearly by the same angle to the axial direction of the encoder 4b in the same direction respectively. Also, the sensing portions of a pair of sensors 6a, 6b, which are attached to the inner end portion of the outer ring 1 via the cover 5 and the sensor holder 7, are opposed closely to two locations of an outer peripheral surface, which acts as the sensed surface, in a vertical direction (portions whose phases in the circumferential direction are different mutually by 180 degree) of the front half portion of the encoder 4b.

In the case of a rolling bearing unit for supporting the wheel of the automobile, the axial load applied between the outer ring 1 and the hub 2 is input from a contacting surface between an outer peripheral surface of a tire, which constitutes the wheel coupled/fixed to this hub 2, and road surface. Since this contacting surface exists on an outer side from a center of rotation of the outer ring 1 and the hub 2 in the radial direction, the axial load is not applied as pure axial load between the outer ring 1 and the hub 2 but is applied together with a moment in a virtual plane (in the vertical direction) containing center axes of the outer ring 1 and the hub 2 and a center of the contacting surface. When this moment is applied between the outer ring 1 and the hub 2, the center axis of the hub 2 is inclined to the center axis of the hub 2. Accordingly, the upper end portion of the encoder 4b is displaced in any direction with respect to the axial direction, and also the lower end portion of the same encoder is displaced in the opposite direction. As a result, phases of the output signals of both sensors 6a, 6b whose sensing portions are opposed closely to upper and lower end portions of the outer peripheral surface of the encoder 4b respectively are shifted in the opposite direction from the neutral position respectively. Therefore, the direction and the magnitude of the axial load can be derived based on the direction and the magnitude of the phase shift of the output signals of both sensors 6a, 6b.

In the case of a fourth example of the conventional structure shown in FIGS. 20 and 21, through holes 8b, 8b and column portions 9b, 9b (see FIG. 21) are arranged alternately at an equal interval in the circumferential direction in the front half portion of a cylindrical encoder 4c, which is made of a magnetic metal plate and is securely fitted to the inner end portion of the hub 2. The through holes 8b, 8b are shaped into a trapezoid respectively when viewed from the radial direction, and the width dimension along the circumferential direction is changed gradually in the axial direction respectively. Also, the sensing portion of one sensor 6 being attached via the cover 5 and the sensor holder 7 is opposed closely to the outer peripheral surface, which acts as the sensed surface, of the front half portion of the encoder 4c. In the case of the fourth example of the conventional structure constructed in this manner, when the outer ring 1 and the hub 2 are displaced relatively in the axial direction based on the axial load, a duty ratio (high potential duration time/one period) of an output signal of the sensor 6 is changed. Therefore, not only a magnitude of the relative displacement but also a magnitude of the axial load can be derived based on this duty ratio.

Here, in the case of the first and second examples of the conventional structure shown in above FIGS. 14 to 17, only a set of sensors consisting of a pair of sensors 6a, 6b whose sensing portions are opposed to the first and second characteristic changing portions 10, 11 respectively are provided. In contrast, although not illustrated, in Patent Literature 3 and Patent Application No. 2006-345849, such a structure is set forth that displacements or external forces in multiple directions are sensed by providing a plurality of sensor sets each of which is composed of a pair of sensors.

By the way, in the case of the conventional structure and the structure of the prior invention, a thermal expansion or a thermal contraction is caused in respective constituent members in use due to changes in a heating value in the bearing portion and an environmental temperature. As a result, in the first and second examples of the conventional structure shown in FIGS. 14 to 17, there is such a possibility that, for example, as shown in (A)→(B) of FIG. 22, the sensed surface of the encoder 4 and the sensing portions of a pair of sensors 6a, 6b should be relatively displaced in the axial direction (the vertical direction in FIG. 22) like the case where an axial load is changed. When such relative displacement is caused, a phase difference existing between the output signals of both sensors 6a, 6b is changed, as indicated by a solid line→a broken line in FIG. 23. In this manner, when the phase difference is changed according to the thermal expansion or the thermal contraction (for another reason from that the axial load is changed), a zero point of the relationship that exists between the phase difference and the status variation (a value of the phase difference in a state that the radial load is not applied) is deviated. For this reason, an error is caused in a measured result of the above status variable according to this deviation. The error produced by such cause can be reduced by correcting a zero point on the side of the calculator while measuring a surrounding temperature of the bearing portion, or the like. In this case, from a viewpoint of keeping a measuring accuracy, it is not preferable that a change of the phase difference caused due to the thermal expansion or the thermal contraction becomes excessively large. Therefore, it is desired that the structure that is able to suppress an amount of change of the phase difference, which is caused due to the thermal expansion or the thermal contraction, sufficiently small should be implemented. In particular, a coefficient of linear expansion of a synthetic resin as the material of the sensor holder 7 is larger than that of a metal as material of other constituent members such as the outer ring 1, the hub 2, the rolling elements 3, 3, the cover 5, etc. As a result, it is desired that a structure capable of suppressing an amount of change of the phase difference, which is produced due to the thermal expansion or the thermal contraction of the sensor holder 7, should be implemented.

In other words, in the case of respective conventional structures, an end surface of the sensor holder 7 in the axial direction is brought into contact with an inner surface of the bottom plate portion 13 of the cover 5 in a state that the sensor holder 7 is held/fixed in an interior of the cover 5 by the mold forming or the adhesion. Therefore, the cylinder portion 14, which is holding the sensors 6a, 6b, out of the sensor holder 7 is thermally expanded or contracted in the axial direction from the side surface of the bottom plate portion 13 as an origin. Accordingly, for example, as shown in (A)→(B) of FIG. 22 or as shown by a thermal expansion in FIG. 24, both sensors 6a, 6b are displaced according to the thermal expansion or the thermal contraction mutually in the same direction along the axial direction. In contrast, the encoder 4 that is attached to the inner end portion of the hub 1 is hardly displaced in the axial direction (merely slightly displaced in contrast to both sensors 6a, 6b). As a result, it is possible to say that, in the case of respective conventional structures, the relative displacement between the sensed surface of the encoder 4 and the sensing portions of both sensors 6a, 6b in the axial direction is mainly caused based on the thermal expansion or the thermal contraction of the sensor holder 7.

As shown in above FIGS. 14 to 17, the above explanation is applied to the structure that senses either the relative displacement between the outer ring 1 and the hub 2 in the axial direction or the axial load acting between the outer ring 1 and the hub 2, based on the phase difference between a pair of sensors 6a, 6b being arranged in a state that the sensors 6a, 6b are separated in the axial direction. The phenomenon that the thermal expansion or the thermal contraction of the sensor holder 7 yields the measuring error may also occur in different degrees in respective cases of the above third example of the conventional structures shown in FIGS. 18 and 19, the above fourth example of the conventional structures shown in FIGS. 20 and 21, and the structure of the prior invention. For example, in the case of the third example of the conventional structure, when an amount of displacement caused based on the thermal expansion or the thermal contraction in the axial direction is varied between the sensors 6a, 6b, the measuring error is caused. Also, in the case of the fourth example of the conventional structure, the displacement of the sensor 6 caused based upon the thermal expansion or the thermal contraction in the axial direction yields the measuring error as it is. Therefore, as described above, it is desired that the structure capable of suppressing satisfactorily an amount of change of the phase difference caused by the thermal expansion or the thermal contraction of the sensor holder 7 should be implemented.

Patent Literature 1: JP-A-2006-113017
Patent Literature 2: JP-A-2006-317420
Patent Literature 3: JP-A-2007-93580

DISCLOSURE OF THE INVENTION

Problems that the Invention is to Solve

In view of the above circumstances, a state measuring apparatus for a rolling bearing unit and a method of manufacturing the same of the present invention are invented to implement a structure that is capable of suppressing such a situation that a harmful relative displacement in an axial direction, which yields a measuring error, is caused between a sensor and an encoder based on a thermal expansion or a thermal contraction of a sensor holder made of a synthetic resin, and a method of manufacturing the structure.

Means for Solving the Problems

A state measuring apparatus for a rolling bearing unit as an object of the present invention includes a rolling bearing unit and a state measuring apparatus.

Out of them, the rolling bearing unit is equipped with an outer ring, a hub, a plurality of rolling elements. Also, the outer ring has double row outer ring raceways on an inner peripheral surface and is not rotated in use. Also, the hub has double row inner ring raceways on an outer peripheral surface and is rotated in use. Also, the rolling element is provided rotatably in plural in each row between the double row inner ring raceways and the double row outer ring raceways.

Also, the state measuring apparatus is equipped with an encoder, at least one sensor, and a calculator.

Out of them, the encoder is attached to an end portion of the hub concentrically with the hub, has a cylindrical sensed surface concentrically with the hub, and a characteristic of the sensed surface is changed alternately with respect to a circumferential direction.

Also, the sensor is held in a cylindrical cover, which is made of metal and with bottom and fixed to an end portion such that an end portion opening of the outer ring is covered in a state that a sensing portion is opposed to the sensed surface of the encoder, via a sensor holder made of synthetic resin, and changes an output signal in response to a change in the characteristic of the sensed surface.

Also, the calculator has a function of calculating at least one status variable of a relative displacement between the outer ring and the hub and an external force applied between the outer ring and the hub, based on the output signal of the sensor.

In particular, in the state measuring apparatus for the rolling bearing unit according to a first aspect, the sensor holder has an annular portion that holds at least the sensor. Also, the sensor holder is attached to the cylindrical portion via a holding ring that is fixed to an inner peripheral surface of a cylinder portion constituting the cover when the holding ring is embedded in an intermediate portion of the annular portion in an axial direction.

When such state measuring apparatus for the rolling bearing unit of the present invention is embodied, as a second aspect, the sensor is provided in plural, for example. Also, a plurality of sensors are provided in mutually different positions in the axial direction on an inner diameter side of the cylinder portion constituting the cover. Also, a position in which the holding ring is embedded in the annular portion of the sensor holder in the axial direction corresponds to a center position between sensing portions of the sensors.

Alternately, as a third aspect, a sensing portion of at least one sensor is opposed to the sensed surface of the encoder in a same position in the axial direction. Also, a position in which the holding ring is embedded in the annular portion of the sensor holder in the axial direction coincides with a position the sensing portion of the sensor in the axial direction.

Also, when such state measuring apparatus for the rolling bearing unit of the present invention is embodied, as a fourth aspect, preferably a clearance portion exists between the annular portion of the sensor holder and a bottom plate portion of the cover.

Also, preferably, in fifth and sixth aspects, the holding ring has an inner diameter side cylinder portion, and a folded portion. The inner diameter side cylinder portion is securely fitted in the cylinder portion of the cover by means of a tight fit. Also, the folded portion is folded inward from one end edge of the inner diameter side cylinder portion in the radial direction.

Also, in the fifth aspect, the inner diameter side cylinder portion is securely fitted in the cylinder portion of the cover by means of a tight fit in a state that other end edge in the axial direction is pushed against an inner surface of the bottom plate portion constituting the cover, and a position of the folded portion in the axial direction is made to coincide with a position of the sensing portion of the sensor in the axial direction in a state that the inner diameter side cylinder portion is fixed.

Also, in the sixth aspect, a part of the synthetic resin constituting the sensor holder enters into a clearance between an outer peripheral surface of the curved surface portion, which has a circular arc section and connects the inner diameter side cylinder portion and the folded portion, and an inner peripheral surface of the cylinder portion of the cover.

Also, in a seventh aspect, preferably a situation that the sensor holder is rotated with respect to the holding ring is prevented by engaging convex portion of the sensor holder and concave portions provided in a part of the holding ring made of a metal plate.

In the case of such seventh aspect, as an eighth aspect, for example, the engaging concave portions are notches formed in an edge portion of the holding ring.

Alternately, as a ninth aspect, the engaging concave portions are through holes formed in a part of the holding ring.

Also, when the present invention is embodied, as a tenth aspect, for example, the sensor holder is provided on both sides of the bottom plate portion constituting the cover. Also, both side portions are coupled mutually through a coupling portion existing in a through hole that is formed in a center portion of the bottom plate portion. Also, a rotation of the sensor holder with respect to the cover is blocked in terms of an engagement between noncircular-shaped portions formed on a peripheral portion of the through hole and any portion of the sensor holder.

In the case of such tenth aspect, as an eleventh aspect, preferably water-tightness between the sensor holder and the cover is ensured by an O ring that is provided between a surrounding portion of the through hole on a side surface, which is located on an opposite side to an internal space in which the sensor is provided, out of both side surfaces of the cover in the axial direction, and an engaging concave, which is formed in a portion of the sensor holder opposing to the surrounding portion.

Also, when the present invention is embodied, as a twelfth aspect, for example, the sensor holder has a preforming portion and a postforming portion. Out of them, the preforming portion is formed before the sensor holder is fitted to the cover. Also, the postforming portion is formed by injecting a fused resin between the cover and the preforming portion in a state that the cover and the preforming portion are set in a predetermined positional relationship. Also, a holding hole into which the sensor is inserted in the axial direction and a pair of holding convex portions protruded from both inner side surfaces of the holding hole in the circumferential direction to come close to each other are provided to the preforming portion. Also, the sensor is held and fixed in the holding hole by the postforming portion in a state that the sensor is inserted while expanding elastically an interval between top end edges of both holding convex portions.

Also, according to a thirteenth aspect, in a method of manufacturing a state measuring apparatus for a rolling bearing unit of the present invention, which corresponds to the manufacturing method of manufacturing structure set forth in the above fourth aspect, first a circular disc-like terminal holder of the sensor holder is formed by injecting a synthetic resin from an outside of the cover. This terminal holder has an outer diameter that is fitted into an innermost end portion of the cover, and an annular concave portion that is provided to a portion of one side surface portion located near the outer diameter in the axial direction to oppose to the bottom plate portion of the cover is formed. In the method of manufacturing the state measuring apparatus for the rolling bearing unit of the present invention, such terminal holder is fitted into the innermost end portion.

Then, the holding ring is securely fitted in an intermediate portion of the cylinder portion constituting the cover in the axial direction. Then, the annular portion, which holds the sensor, of the sensor holder is formed on an inner diameter side of the cylinder portion by an injection molding in a state that the holding ring is embedded in the annular portion.

When such method of manufacturing a state measuring apparatus for a rolling bearing unit of the present invention is carried out, preferably, in a fourteenth aspect, when the terminal holder of the sensor holder is formed injecting synthetic resin from an outside of the cover, a base end portion of the terminal used to fetch the output signal of the sensor is embedded in a portion of one side surface portion of the terminal holder, which is located near the inner diameter in the axial direction, and also a base end portion of the conductor used to coupling fix the sensor to a top end portion is embedded in a portion of other side surface portion of the terminal holder, which is located near the outer diameter in the axial direction, in a state that respective top end portions are protruded from the side surfaces of the holder in the axial direction.

Then, the terminal holder is fitted into the innermost portion of the cover and also a top end portion of the terminal is protruded to an outside of the cover via the through hole formed in the bottom plate portion of the cover.

Then, the annular portion, which holds the sensor, and the connector portion, into which a plug connected to the terminal is inserted, are formed by the injection molding to put the bottom plate portion and the terminal holder between them from both sides in the axial direction.

ADVANTAGES OF THE INVENTION

According to the state measuring apparatus for the rolling bearing unit and the method of manufacturing the same of the present invention constructed as above, such a situation can be suppressed that the harmful relative displacement in the axial direction, which yields the measuring error, is caused between the sensor and the encoder even when the sensor holder formed of a synthetic resin is thermally expanded or a thermally contracted.

That is, according to the state measuring apparatus for the rolling bearing unit of the present invention, the intermediate portion of the annular portion, which holds the sensor, out of the sensor holder in the axial direction is coupled/fixed to the cylinder portion of the cover made of metal via the holding ring that is securely fitted in this cylinder portion. Therefore, the intermediate portion, in which the holding ring is embedded, of the annular portion in the axial direction is never displaced with respect to the cylinder portion of the cover in the axial direction during the thermal expansion or the thermal contraction of the sensor holder. During the thermal expansion or the thermal contraction of the sensor holder of the sensor holder, both side parts of the portion, in which the holding ring is embedded, of the annular portion in the axial direction are displaced mutually symmetrically about the axial direction with respect to the portion, in which the holding ring is embedded/supported, as the boundary. As a result, once the position, in which the sensor is embedded, in the axial direction is set appropriately to the annular portion, such a situation can be suppressed that the thermal expansion or the thermal contraction of the sensor holder directly yields the harmful relative displacement in the axial direction.

For example, according to the structure according to a second aspect, displacements of the sensing portions of a plurality of sensors in the axial direction, which are caused due to the thermal expansion or the thermal contraction of the sensor holder, are directed oppositely mutually in a pair of sensors, which are combined mutually to measure the relative displacement (or the axial load) in the axial direction, out of these sensors. Also, magnitudes of the displacements in the axial direction become substantially equal to each other in both sensors (an error having an adverse effect on a measured value is not caused). Therefore, as shown in above FIGS. 14 to 17, since the encoder, the boundary of the characteristic change of which is formed like the "V"-shape, and the sensors are combined so as to extend over the portion where the inclination direction of the boundary is changed, such a structure can be implemented that, even when positions of the sensed surface of the encoder, which are scanned by the sensing portions of respective sensors, are changed due to the thermal expansion or the thermal contraction of the sensor holder, the phase difference existing between the output signals of respective sensors is hardly changed. Actually, it is possible that the phase difference is changed due to the thermal expansion or the thermal contraction of respective constituent members made of metal other than the sensor holder, nevertheless such phase difference can be suppressed sufficiently small.

Also, according to the structure of the present invention according to a third aspect, the sensor that is embedded/supported in the annular portion of the sensor holder is positioned on the inner diameter side of the holding ring, irrespective of the thermal expansion or the thermal contraction of the sensor holder. Even though the annular portion is expanded/contracted with respect to the holder ring as the boundary to both sides in the axial direction, the position of the sensor in the axial direction is never shifted.

Therefore, according to the state measuring apparatus for the rolling bearing unit of the present invention, a measuring accuracy of a status variable between the outer ring and the hub can be maintained satisfactorily irrespective of a temperature change in use by any structure set forth in claims 2, 3.

In particular, according to a fourth aspect, a clearance portion is provided between the annular portion of the sensor holder and the bottom plate portion of the cover. Hence, such a situation can be eliminated that the end surface of this annular portion in the axial direction pushes strongly the bottom plate portion of this cover. Also, such a situation can be prevented that a strong force is applied in the direction to go away from this bottom plate portion, as a counteraction of this pushing. Therefore, the position of the sensor in the axial direction can be restricted without fail under the condition that a coupling strength of the holding ring to the cover is not particularly increased.

In particular, like the invention according to fifth and sixth aspects, the holding ring consisting of the inner diameter side cylinder portion and the folded portion is employed. Hence, the harmful displacement of the sensor holder from the cover in the axial direction can be suppressed by the structure that can be constructed at a low cost by folding the metal plate.

Also, in the case of the invention according to a fifth aspect, the positioning of the holding ring with respect to the cover, in turn the positioning of the sensor holder with respect to this cover, can be executed with good accuracy. Also, an effect of preventing the displacement of the sensor holder with respect to this cover caused by a temperature rise can be enhanced.

In contrast, in the case of the invention according to a sixth aspect, ricketiness of the sensor holder in the cover in the radial direction can be prevented irrespective of a temperature change.

Also, like the invention according to seventh to ninth aspects, the engaging concave portions provided to a part of the holding ring are concave-convex fitted with the sensor holder. Therefore, even when a minute clearance is produced between the holding ring and the sensor holder at a time of the temperature change, such a situation can be prevented surely that the sensor that is embedded/supported in this sensor holder is turned with respect to the cover. As a result, reliability in measuring a status variable of the rolling bearing unit can be improved by stabilizing the attitude of the sensor much more.

Also, according to the structure of the invention according to a tenth aspect, the attitude of the sensor can be stabilized by blocking the turn of the sensor holder from the cover, and reliability in measuring a status variable of the rolling bearing unit can be improved.

Also, like the structure of the invention according to an eleventh aspect, the O ring used to ensure the water-tightness between the sensor holder and the cover is provided on the opposite side surface side to the internal space. Therefore, an amount of moisture that sinks into a clearance between the sensor holder and the cover can be reduced. Also, the breakage prevention of the joined portion between the sensor holder and the cover can be easily attained even in a state that this moisture freezes.

Also, when the structure of the invention according to a twelfth aspect is employed, a facilitation of the positioning of the sensor with respect to the sensor holder and an improvement of the positioning accuracy can be achieved, and an improvement of reliability in measuring the status variable of the rolling bearing unit can be achieved.

According to the method of manufacturing the state measuring apparatus for the rolling bearing unit of the present invention according to a thirteenth aspect, the structure in which the clearance portion is provided between the annular portion of the sensor holder and the bottom plate portion of the cover according to the fourth aspect can be easily manufactured.

Also, according to the preferred manufacturing method according to a fourteenth aspect, an operation of embedding/supporting the sensor in the annular portion constituting the sensor holder and an operation of providing the terminal for fetching the output signal to the sensor holder or for supplying the power to the sensor can be easily carried out.

BRIEF DESCRIPTION OF THE DRAWINGS

FIG. 5 A front view (A) and a sectional view (B) showing a first example of a holding ring that is engaged with a sensor holding in term of concave-convex fitting, as a second example of the embodiment of the present invention.

FIG. 6 A front view (A) and a sectional view (B) showing a second example of the holding ring.

Figure 1:
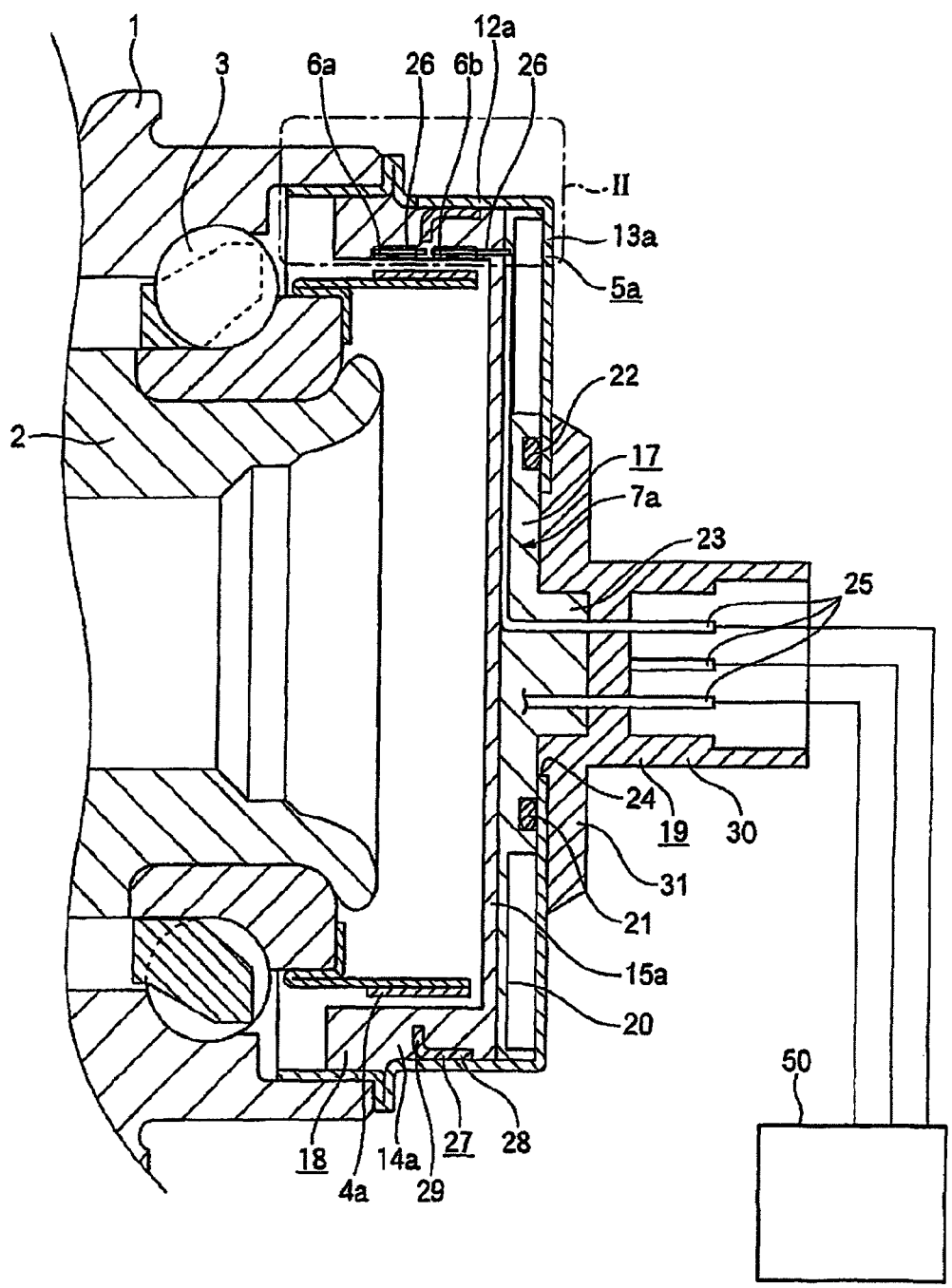
FIG. 1 A pertinent sectional view showing an example of an embodiment of the present invention.
Figure 2:
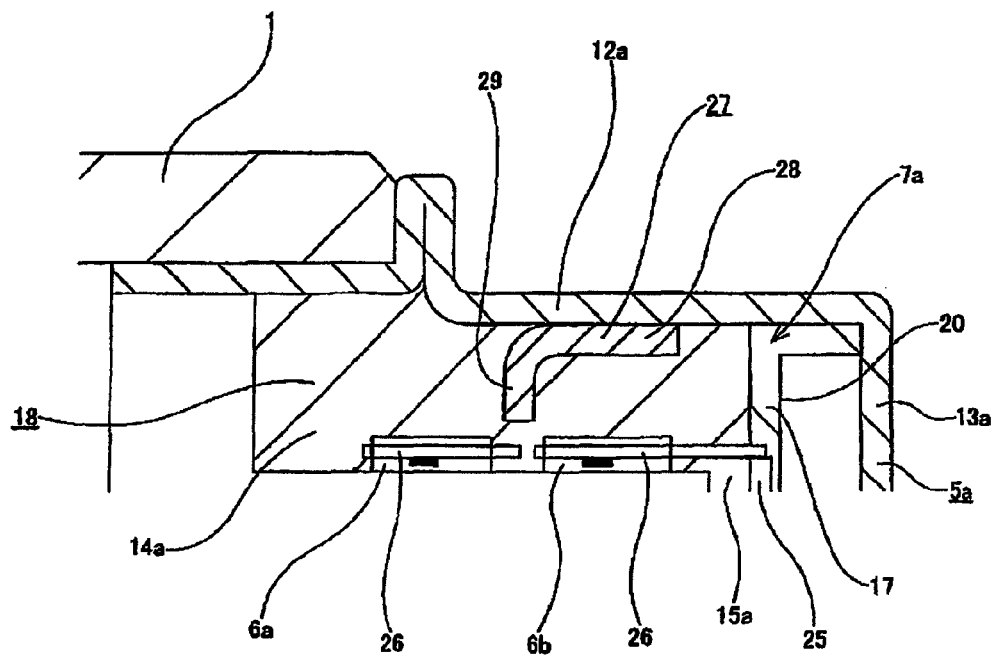
FIG. 2 An enlarged view showing an H portion in FIG. 1.
Figures 3A, 3B:
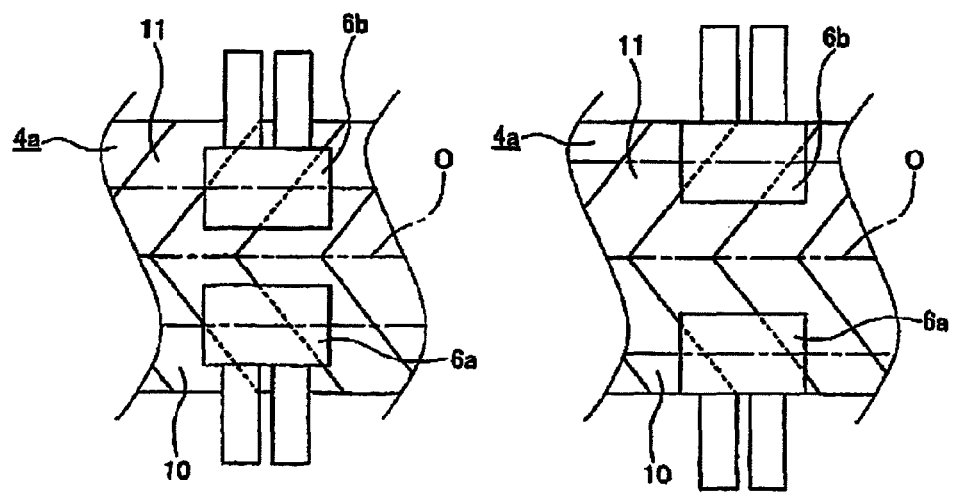
FIG. 3 A view showing such a situation that a pair of sensors are displaced in an axial direction according to a temperature change, when viewed from the outside in a radial direction.
Figure 4A:
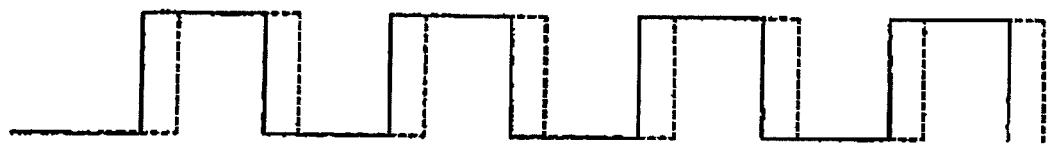
FIG. 4 A diagram showing such a situation that phases of output signals of a pair of sensors are changed according to a temperature change.
Figure 4B:
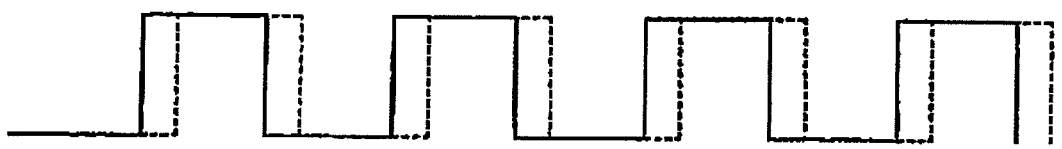

DESCRIPTION OF REFERENCE NUMERALS AND SIGNS 1 outer ring
2, 2a hub
rolling element
4, 4a to 4c encoder
5, 5a cover
6, 6a, 6b sensor
7, 7a, 7b, 7c sensor holder
8, 8a, 8b through hole
9, 9a, 9b column portion
10 first characteristic changing portion
11 second characteristic changing portion
12, 12a cylinder portion
13, 13a bottom plate portion 14, 14a cylinder portion
15, 15a bottom plate portion
16 adhesive
17 terminal holder
18 main holder portion
19 connector portion
20 annular concave portion
21 engaging concave
22, 22a O ring
23 circular convex portion
24, 24a through hole
25 terminal
26 conductor
27, 27a, 27b, 27c holding ring
28, 28a inner diameter side cylinder portion
29 folded portion
30 connector cylinder portion
31 flange portion
32 notch
33 through hole
34 curved surface portion
35 bottom plate portion
36 folded set wall portion
37, 37a notch
38 O ring holder
39 holding groove
40 preforming portion
41 postforming portion
42 holding hole
43 cylinder portion
44 holding convex portion
45 connector portion

BEST MODE FOR CARRYING OUT THE INVENTION

First Example of Embodiment

Figure 17:
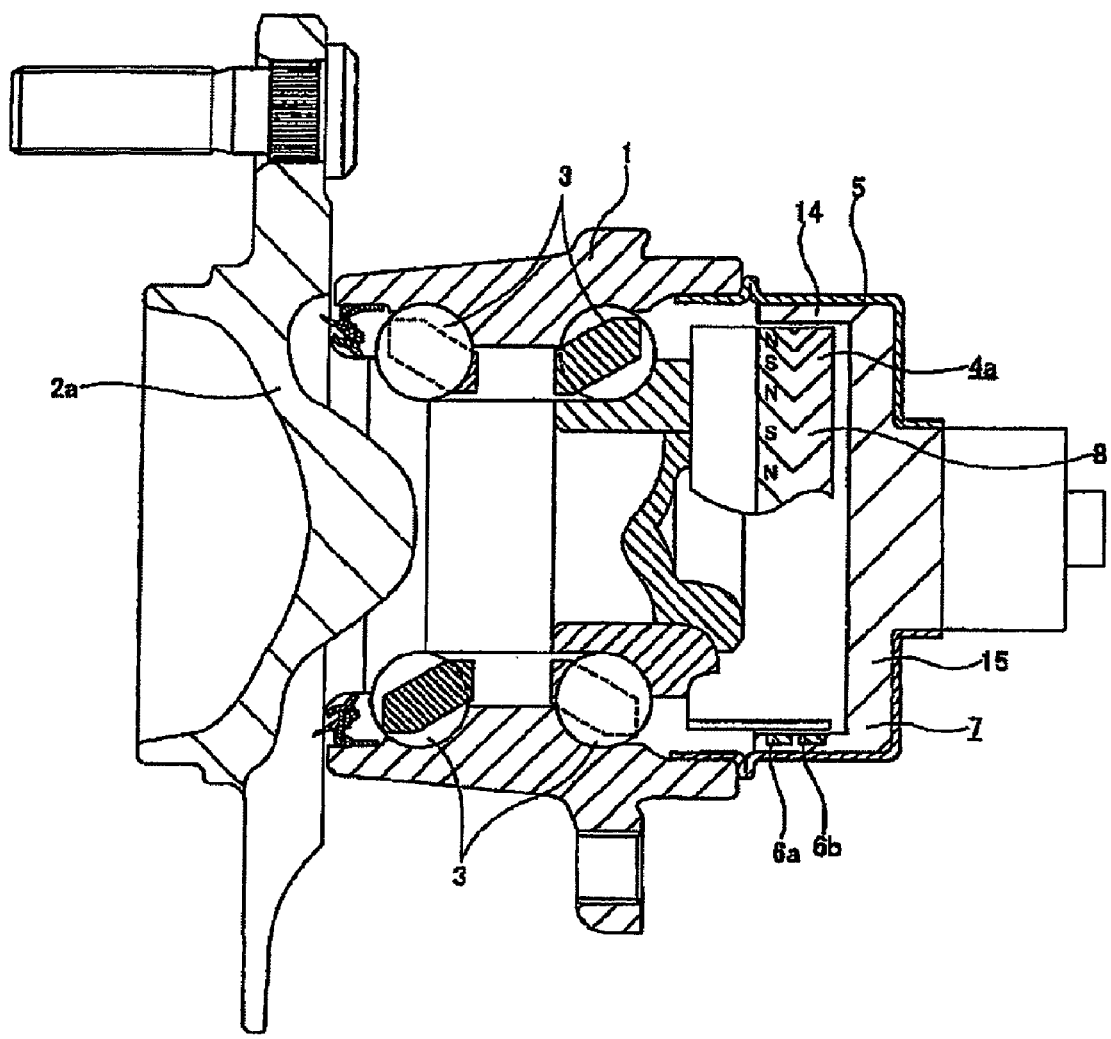
FIG. 17 A sectional view showing a second example of the conventional structure.

FIGS. 1 to 4 show an example of an embodiment of the present invention. Here, a feature of this example resides in the structure of a sensor holder 7a made of a synthetic resin and holding a pair of sensors 6a, 6b and the structure of a cover 5a for holding this sensor holder 7a. Structures and actions of other portions are basically similar to the case in the above second example of the conventional structure shown in FIG. 17. Therefore, the redundant illustration and explanation of the similar portions will be omitted or simplified hereunder, and feature portions of this example will be explained hereinafter.

In the case of this example, the sensor holder 7a is constructed by a terminal holder 17 in an intermediate portion in the axial direction, a main holder portion 18 on an outer side in the axial direction, and a connector portion 19 on an inner side in the axial direction. These portions 17 to 19 are formed of same or different types of mutually weldable synthetic resins by the injection molding, and are integrally joined mutually. Procedures of forming respective portions 17 to 19 by the injection molding will be described later, and first shapes and structures of respective portions will be explained hereunder.

First, the terminal holder 17 is shaped like a disc as a whole, and has an outer diameter that can be fitted into an inner end portion of the cover 5a. Also, an annular concave portion 20 is provided to one side surface (inner side surface) portion, which is located near the outer diameter in the axial direction to oppose to a bottom plate portion 13a of this cover 5a, of both side surfaces of the terminal holder 17 in the axial direction. Also, an engaging concave 21 is formed in an intermediate portion of this one side surface in the radial direction concentrically with the annular concave portion 20. An O ring 22 that is engaged with the engaging concave 21 is brought into elastic contact with an inner surface (an outer side surface in the axial direction) of the bottom plate portion 13a to ensure the water-tightness of a butted portion between the cover 5a and the sensor holder 7a in a state that the sensor holder 7a is fitted in the cover 5a. Also, a clearance portion corresponding to this annular concave portion 20 is formed between the annular concave portion 20 and the bottom plate portion 13a.

Also, a circular convex portion 23 is formed on a center portion or a portion, which is deviated slightly from the center portion, of one side surface of the terminal holder 17 in the axial direction. The circular convex portion 23 is protruded to the outside of the cover 5a (inner side in the axial direction) through a through hole 24, which is formed in the center portion of the bottom plate portion 13a of the cover 5a, in a state that the sensor holder 7a is fitted in the cover 5a. Also, a plurality (e.g., three) of terminals 25, 25 are protruded from a top end surface of the circular convex portion 23. That is, base end portions of the terminals 25, 25 are embedded in the circular convex portion 23, and also intermediate portions to top end portions of these terminals 25, 25 are protruded from the top end surface of the circular convex portion 23 inwardly in the axial direction. Two of these terminals 25, 25 are used to lead output signals of a pair of sensors 6a, 6b, and remaining one is used to supply an electric power to both sensors 6a, 6b.

Further, base end portions of conductors 26, 26 are embedded in a part of the other side surface (outer side surface) portion, which is located near the outer diameter in the axial direction, of the terminal holder 17 in the circumferential direction. These conductors 26, 26 are connected electrically any one of the terminals 25, 25 respectively, and are protruded from the other side surface of the terminal holder 17 to the outside in the axial direction. Also, both sensors 6a, 6b are coupled/supported to top end portions of the conductors 26, 26. Positions of both sensors 6a, 6b in the axial direction are differentiated mutually by changing length dimensions of these conductors 26, 26.

Both sensors 6a, 6b are embedded in a part of a cylinder portion 14a, which denotes an annular portion set forth in claims, constituting the main holder portion 18 as a coupled status to the top end portions of the conductors 26, 26 in the circumferential direction. The main holder portion 18 is shaped into a cylinder with a bottom portion, which consists of the cylinder portion 14a and a bottom plate portion 15a that blocks an inner end opening portion of this cylinder portion 14a in the axial direction. The main holder portion 18 is formed on the other surface side of the terminal holder 17 in the axial direction by the injection molding, and is welded to the terminal holder 17. Also, the main holder portion 18 is firmly coupled/fixed to the cover 5a in a state that a displacement in the axial direction is blocked by means of an engagement with a holding ring 27 described later.

The holding ring 27 is formed like an annular ring whose section has an L-shape, by applying the press working to the same type metal plate as a metal plate (stainless steel plate, carbon steel plate, or the like) constituting the cover 5a. That is, the holding ring 27 is formed by forming an inward directed collar-like folded portion 29 such that one end portion of an inner diameter side cylinder portion 28 in the axial direction (in the illustrated case, an outer end portion) is bent inwardly in the radial direction. Also, a connection portion of the inner diameter side cylinder portion 28 and the folded portion 29 is shaped as a curved surface portion whose section constitutes a circular arc shape. An outer diameter of such holding ring 27 given in a free status of the inner diameter side cylinder portion 28 is slightly smaller than an inner diameter given in a free status of a cylinder portion 12a of the cover 5a. The holding ring 27 is secured firmly to an intermediate portion of this cylinder portion 12a by fitting the inner diameter side cylinder portion 28 into the cylinder portion 12a of the cover 5a by means of the tight fit. The holding ring 27 is embedded in the intermediate portion of the cylinder portion 14a constituting the main holder portion 18 in the axial direction in a state that the main holder portion 18 is formed on the other surface side of the terminal holder 17 in the axial direction in the cover 5a by the injection molding. In particular, in the case of this example, the position of the folded portion 29 in the axial direction is located in a just center portion between the positions of the sensing portions of both sensors 6a, 6b in the axial direction. In this case, the "a just center portion between the positions of the sensing portions of both sensors 6a, 6b in the axial direction" coincides with a center position O of the sensed surface of the encoder 4a in the wide direction (a position where the inclination direction of the boundary of the characteristic change is changed in a neutral status that the outer ring 1 and the hub 2 are not relatively displaced in the axial direction).

Also, the connector portion 19 is formed on the inner side surface side of the bottom plate portion 13a constituting the cover 5a by the injection molding in a state that the connector portion 19 contains the circular convex portion 23 of the terminal holder 17, and is welded to the terminal holder 17. The connector portion 19 is constructed by a connector cylinder portion 30 which is formed in the portion that surrounds the terminals 25, 25 and into which a plug provided to an end portion of a cable (not shown) can be inserted, and a flange portion 31 which is formed on a base end portion of the connector cylinder portion 30 (an outer end portion in the axial direction) and whose diameter is larger than the through hole 24 that is formed in the center portion of the bottom plate portion 13a. Such connector portion 19 is formed on one side surface side of the terminal holder 17 in the axial direction by the injection molding, and is welded to the terminal holder 17. Also, the terminals 25, 25 are connected to a calculator 50 that is arranged out of the bearing unit. The calculator 50 can detect a direction and a magnitude of the relative displacement in the axial direction and an acting direction and a magnitude of the axial load, which are a status variable between the outer ring 1 and the hub 2 respectively, based on whether or not the phases of the output signals of both sensors 6a, 6b are shifted and the direction and the magnitude of the phase shifts when the phase shifts are present.

When the state measuring apparatus for the rolling bearing unit of this example is manufactured, first the terminal holder 17 is formed on the outside of the cover 5a by the injection molding of a synthetic resin. At this time, the base end portions of the terminals 25, 25 and the base end portions of the conductors 26, 26 are embedded in predetermined portions of the terminal holder 17. In this status, the conductors 26, 26 and the terminals 25, 25 are connected electrically mutually in advance. Such terminal holder 17 is formed by the injection molding, and the terminal holder 17 is fitted into the innermost end portion of the cover 5a. Prior to the fitting operation, the O ring 22 is fitted into the engaging concave 21.

The terminal holder 17 is fitted into the innermost end portion of the cover 5a, and then the O ring 22 is elastically compressed between a bottom surface of the engaging concave 21 and the bottom plate portion 13a of the cover 5a. Then, the holding ring 27 is securely fitted in the intermediate portion of the cylinder portion 12a constituting this cover 5a in the axial direction by means of the sufficiently large tight fit. In this case, a top end portion of the inner diameter side cylinder portion 28 of the holding ring 27 is pushed against the terminal holder 17, if necessary, to keep a compressed status of the O ring 22. Then, the main holder portion 18 is formed on the inner diameter side of the cylinder portion 12a by the injection molding, and the connector portion 19 is formed out of the bottom plate portion 13a by the injection molding. In forming the main holder portion 18 by the injection molding, the holding ring 27 is embedded in the intermediate portion of the cylinder portion 14a in the axial direction.

In the case of the state measuring apparatus for the rolling bearing unit constructed as above and manufactured as above, when the sensor holder 7a is thermally expanded or thermally contracted according to a temperature change in use, both sensors 6a, 6b are displaced correspondingly in the opposite direction with respect to the axial direction and at the same magnitude mutually on a basis of the center position O in the width direction. For example, when the sensor holder 7a thermally expandeds, as shown in (A)→(B) in FIG. 3, both sensors 6a, 6b are displaced to get away from the engagement portion between the folded portion 29 of the holding ring 27 and the main holder portion 18 in the axial direction (the lateral direction in FIGS. 1 and 2, the vertical direction in FIG. 3), and are displaced at the same magnitude mutually on a basis of the center position O in the width direction, which coincides with the position of the engagement portion between the folded portion 29 of the holding ring 27 and the main holder portion 18 in the axial direction. As a result, for example, as indicated by a solid line→broken line in FIG. 4, the phases of the output signals of both sensors 6a, 6b are changed in the same direction mutually and at the same magnitude mutually. For this reason, not only an amount of relative displacement between the outer ring 1 and the hub 2 in the radial direction caused based on the output signals of both sensors 6a, 6b but also the axial load acting between the outer ring 1 and the hub 2 can be detected with good precision.

In this case, when the cylinder portion 14a of the sensor holder 7a is thermally expanded, the inner end surface of the cylinder portion 14a in the axial direction presses the end portion of the terminal holder 17 on the outer diameter side. In such status, when a surface pressure of the contact portion between the inner end surface of the cylinder portion 14a in the axial direction and the end portion of the terminal holder 17 on the outer diameter side is increased, the overall main holder portion 18 tends to displace outward in the axial direction, irrespective of the engagement between the folded portion 29 and the main holder portion 18. In contrast, in the case of this example, the clearance portion created based on the annular concave portion 20 exists on the end portion of the terminal holder 17 on the outer diameter side with which the inner end surface of the cylinder portion 14a in the axial direction comes into contact. Therefore, an increase of a surface pressure of the contact portion is restricted, and the overall main holder portion 18 is never displaced outward in the axial direction. For this reason, even when a temperature rise becomes remarkable, an amount of relative displacement and the axial load can be detected with good precision.

In the case of thermal contraction, direction of change becomes reversed from the case of thermal expansion, but the similar result can be obtained. Therefore, in the case of this example, when the phases of the output signals of both sensors 6a, 6b are changed respectively following upon the thermal expansion or the thermal contraction of the sensor holder 7a, a phase difference existing between the output signals of both sensors 6a, 6b is not changed. Actually the phase difference may be changed due to the thermal expansion or the thermal contraction of respective metallic constituent members other than the sensor holder 7a, but a change of such phase difference can be suppressed sufficiently small. That is, dimensions of the constituent members of the rolling bearing unit, the cover 5a, and the encoder 4a are also changed due to the thermal expansion or the thermal contraction, nevertheless the directions of change are aligned and also a difference in a coefficient of linear expansion between respective members becomes slight. Therefore, a change of the phase difference can be suppressed. As a result, in the case of this example, the measuring precision of status variables between the outer ring 1 and the hub 2 can be maintained satisfactorily regardless of a temperature change at a time of use.

Second Example of Embodiment

Next, FIGS. 5 and 6 show holding rings 27a, 27b employed when a structure of a second example is carried out respectively. Since such holding rings 27a, 27b are employed, a situation can be prevented that, even when a minute clearance is produced due to a temperature change between the holding rings 27a, 27b and the main holder portion 18 of the sensor holder 7a formed of a synthetic resin (see FIGS. 1 and 2), the holding rings 27a, 27b and the sensor holder 7a are relatively rotated. That is, a coefficient of thermal expansion of the metal material (e.g., the carbon steel) constituting the holding rings 27a, 27b out of them is larger than that of a synthetic resin constituting the sensor holder 7a. Accordingly, such a situation cannot be avoided that a minute clearance is produced between the sensor holder 7a and the holding rings 27a, 27b, following upon a temperature fall after the sensor holder 7a is formed by the injection molding. Therefore, when no measure is applied, it is possible that, although small it is, the sensor holder 7a is rotated with respect to the holding rings 27a, 27b by a vibration, etc. Also, it is possible that, when the sensor holder 7a is rotated, reliability of the status variable measurement by both sensors 6a, 6b (see FIGS. 1 to 3) is lost.

Therefore, like this second example, engaging concave portions such as notches 32, 32 (see FIG. 5), through holes 33, 33 (see FIG. 6), or the like are formed in the holding rings 27a, 27b. Then, the engaging concave portions and the main holder portion 18 of the sensor holder 7a are concave-convex fitted mutually when the main holder portion 18 is formed by the injection molding. Therefore, even when a minute clearance is produced, such a situation can be prevented surely that both sensors 6a, 6b embedded/supported in the sensor holder 7a are rotated with respect to the cover 5a (see FIGS. 1 and 2). As a result, the attitude of both sensors 6a, 6b can be stabilized much more, and reliability of the status variable measurement of the rolling bearing unit can be improved much more. In this event, the positions in which the engaging concave portions such as notches 32, 32, through holes 33, 33, or the like are formed are not limited to the folded portion 29, and such positions may be located in the inner diameter side cylinder portion 28. That is, the notches may be formed in the end edge portion of the inner diameter side cylinder portion 28, or the through holes may be formed in the inner diameter side cylinder portion 28. Also, engaging convex portions (e.g., projecting pieces on the end edge portion) may be formed on a part of the holding ring, and then these engaging convex portions and the main holder portion 18 may be concave-convex engaged with each other. Further, engaging concave-convex portions may be formed on a part of the cover 5a that opposes to a part of the sensor holder 7a (any portion out of the terminal holder 17, the main holder portion 18, and the connector portion 19), and then the be concave-convex engaged with each other and a part of the sensor holder 7a may be concave-convex engaged with each other. In summary, any positions where the engaging concave-convex portions are engaged with a part of the synthetic resin constituting the sensor holder 7a in executing the injection molding of the main holder portion 18 or the connector portion 19, in combining the terminal holder 17 and the cover 5a, or the like may be employed.

The configurations and the actions of remaining portions are similar to those in the case of the above first example of the embodiment, and therefore illustration and explanation of the equivalent portions will be omitted herein.

Third Example of Embodiment

Figure 7:
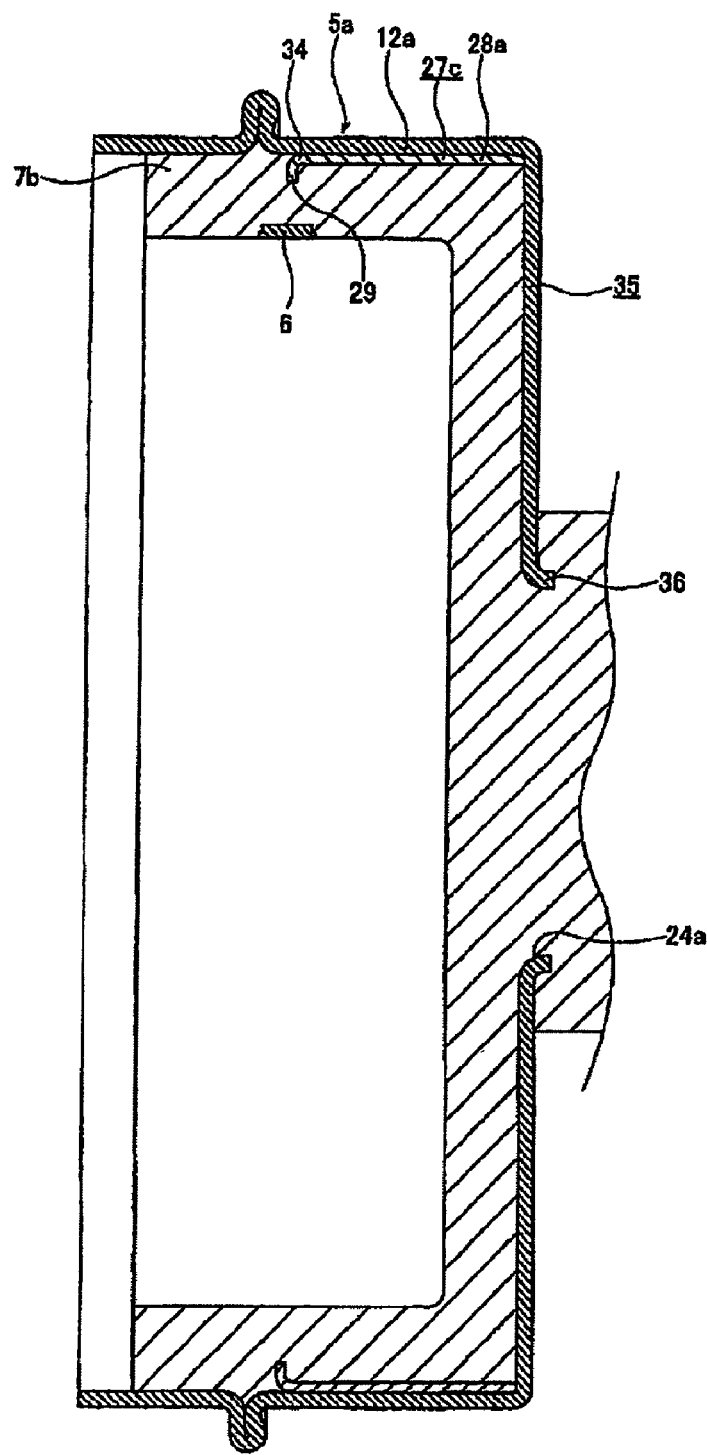
FIG. 7 A sectional view showing a sensor holder that is holding a sensor and a cover, as a third example of the embodiment of the present invention.
Figure 8:
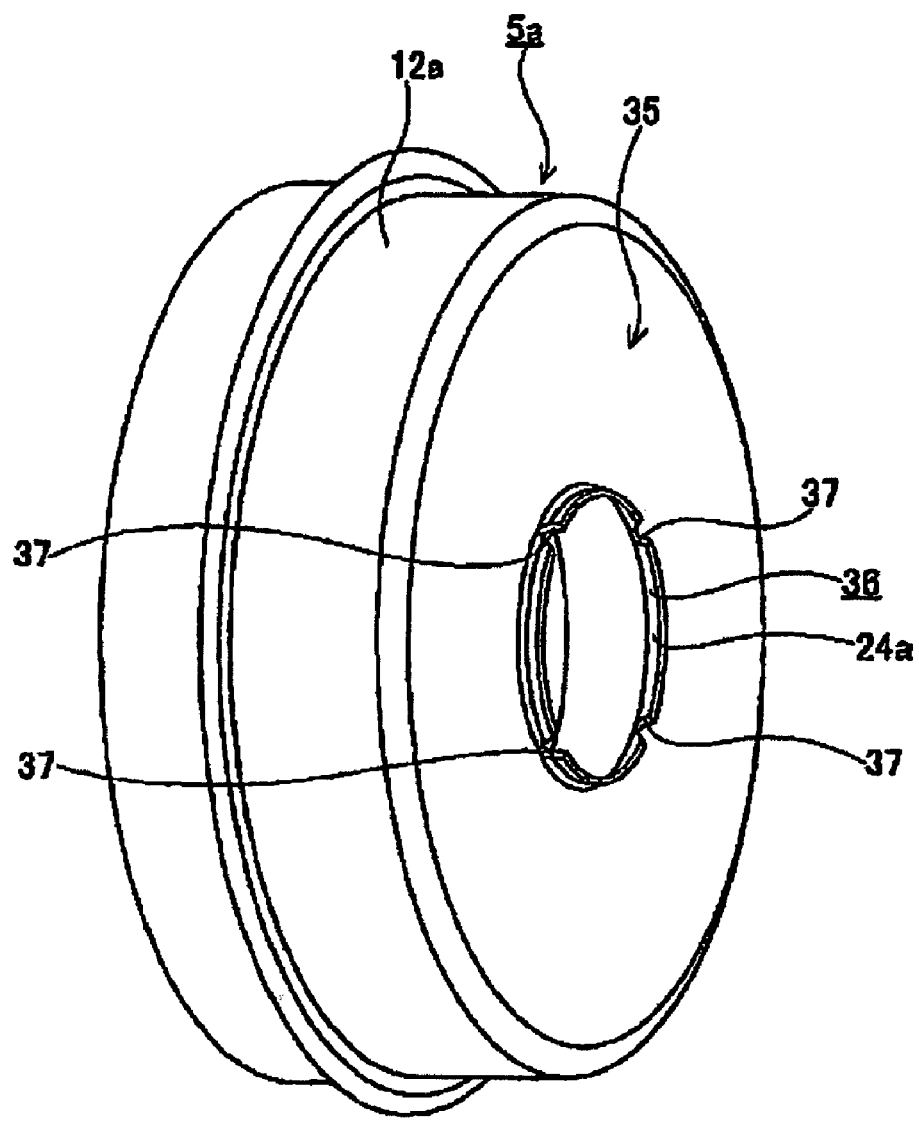
FIG. 8 A perspective view showing the same cover.
Figure 9A:
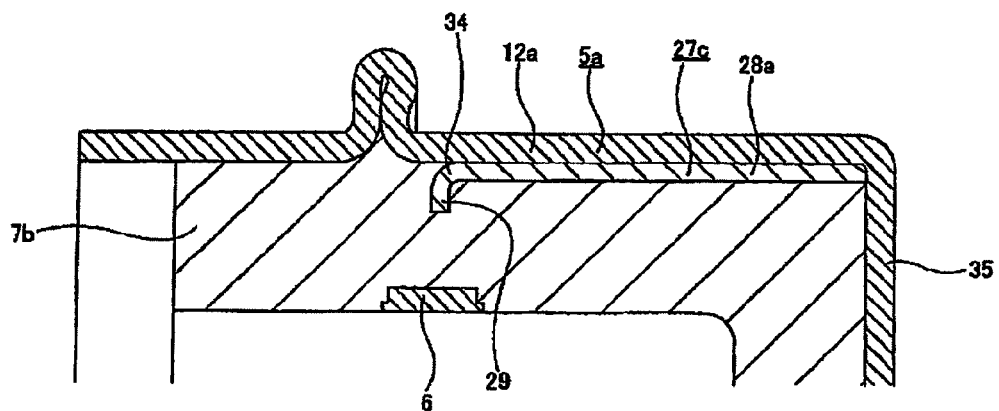
FIG. 9 An enlarged sectional view showing a structure (A) of the third example of the embodiment and an another structure (B), which corresponding to a top portion in FIG. 7.
Figure 9B:
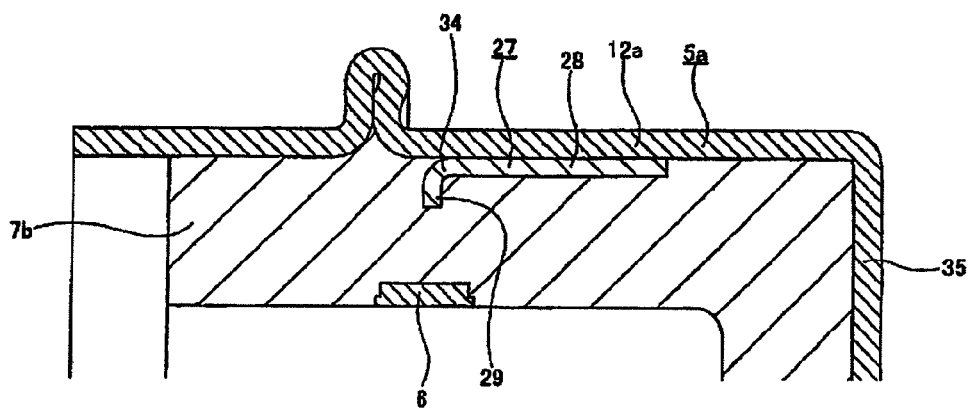

FIGS. 7, 8 and (A) of FIG. 9 show a third example of the embodiment of the present invention. In the case of this example, like the case of the first example of the above embodiment, a holding ring 27c is shaped into a cylindrical shape as a whole by bending the same type (a coefficient of linear expansion is same) metal plate as the metal plate constituting the cover 5a. That is, the holding ring 27c is formed such that the inward directed collar-like folded portion 29 is formed by bending one end portion of an inner diameter side cylinder portion 28a in the axial direction (in the illustrated case, an outer end portion) inwardly in the radial direction. Also, a connection portion between the inner diameter side cylinder portion 28a and the folded portion 29 is formed to constitute a curved surface portion 34 whose section is a circular arc shape. Then, the inner diameter side cylinder portion 28a is securely fitted in the cylinder portion 12a of the cover 5a by the tight fit, and the other end portion of the inner diameter side cylinder portion 28a in the axial direction (inner end edge) is brought into contact with an inner surface of a bottom plate portion 35 constituting the cover 5a. In this status, the dimension of the holding ring 27c in the axial direction and the setting position of this sensor 6 are restricted such as the position of the folded portion 29 in the axial direction agrees with the position of the sensing portion of the sensor 6 embedded/supported in a sensor holder 7b in the axial direction. Also, a part of the other end portion of the inner diameter side cylinder portion 28a, which is located close to the outer diameter in the axial direction, is chamfered like a partial convex conical shape so that an interference of the outer peripheral edge of the other end portion with the cylinder portion 12a of the cover 5a and the bent portion of the bottom plate portion 35 can be prevented.

The sensor holder 7b is formed by injecting a fused resin in a cavity in the die in a state that the holding ring 27c is fixed in a predetermined position on the inner diameter side of the cover 5a and then the cover 5a and the sensor 6 are set in a predetermined position in the cavity in the die. The sensor holder 7b is formed by the injection molding, and simultaneously the holding ring 27c and the sensor 6 are embedded in the sensor holder 7b. During forming the sensor holder 7b by the injection molding, a part of the fused resin enters into a clearance between the outer peripheral surface of the curved surface portion 34 and the inner peripheral surface of the cylinder portion 12a of the cover 5a.

Also, in the case of this example, as shown in FIGS. 7 and 8, a folded set wall portion 36 is formed on the peripheral portion of a through hole 24a, which is provided in the center portion of the bottom plate portion 35, in the opposite direction to the internal space in which the sensor 6 is provided (inward in the axial direction). Also, notches 37, 37 are formed in one to plural locations of the top end edge of the folded set wall portion 36. Then, during the injection molding of the sensor holder 7b, the folded set wall portion 36 is embedded in the synthetic resin constituting the sensor holder 7b and also the notches 37, 37 are engaged with the synthetic resin. Therefore, the synthetic resin constituting the sensor holder 7b is provided in the surrounding portion of the through hole 24a on both sides of the bottom plate portion 35 in the axial direction. Here, in the case of this example, the notches 37, 37 correspond to a noncircular-shaped portion respectively.

According to the structure of this example constructed as above, not only the positioning of the holding ring 27c with respect to the cover 5a in the axial direction can be done with good accuracy, but also such a situation can be prevented that the axial position and the circumferential position of the holding ring 27c and the sensor 6 are displaced irrespective of a temperature change, and also ricketiness of the sensor holder 7b in the cover 5a in the radial direction can be prevented. The reasons for these effects will be explained with reference to FIG. 9 hereunder.

First, the reason why the positioning of the holding ring 27c with respect to the cover 5a in the axial direction can be done with good accuracy is that, as shown in (A) of FIG. 9, the other end portion of the inner diameter side cylinder portion 28a in the axial direction is brought into contact with the inner surface of the bottom plate portion 35 of the cover 5a. Since a part of the other end portion of the inner diameter side cylinder portion 28a, which is located close to the outer diameter in the axial direction, is chamfered, as described above, the other end portion in the axial direction can be brought surely into contact with the flat portion out of the inner surface of the bottom plate portion 35. Hence, the positioning of the holding ring 27c with respect to the cover 5a in the axial direction can be attained with good accuracy. Also, the position of the folded portion 29 with respect to the cover 5a in the axial direction can be restricted with good accuracy. Therefore, even if the positioning accuracy of the sensor 6 with respect to the sensor holder 7b (positioning accuracy of the sensor 6 in the cavity for the injection molding) can be ensured, the center position of the folded portion 29 in the depth direction can be made to coincide with the sensing portion of the sensor 6 with good accuracy.

Also, the effect of preventing such a situation that the axial position and the circumferential position of the holding ring 27c and the sensor 6 are displaced irrespective of a temperature change can be achieved by bringing the other end edge of the inner diameter side cylinder portion 28a of the holding ring 27c in the axial direction into contact with the inner surface of the bottom plate portion 35 of the cover 5a. When the other end edge is brought into contact in this manner, as shown in (A) of FIG. 9, the synthetic resin constituting the sensor holder 7b does not exist between the other end edge of the holding ring 27c and the inner surface of the bottom plate portion 35 in the axial direction. In contrast, as shown in (B) of FIG. 9, when the inner diameter side cylinder portion 28a of the holding ring 27c is not brought into contact with the inner surface of the bottom plate portion 35 of the cover 5a, the synthetic resin constituting the sensor holder 7b enters into a cylindrical space between the other end edge of the inner diameter side cylinder portion 28a and the inner surface of the bottom plate portion 35 in the axial direction. Since a coefficient of linear expansion of the synthetic resin is larger than that of the metal constituting the cover 5a, the synthetic resin that entered into the cylindrical space expands between the other end edge of the inner diameter side cylinder portion 28a in the axial direction and the inner surface of the bottom plate portion 35 according to a temperature rise.

Then, when this thrusting force exceeds a frictional force acting the contact portion between the outer peripheral surface of the inner diameter side cylinder portion 28a and the inner peripheral surface of the cylinder portion 12a of the cover 5a, the holding ring 27c is displaced/moved to separate away from the bottom plate portion 35 (outward in the axial direction). In contrast, in the case of this example, the synthetic resin does not exist between the other end edge of the holding ring 27c and the inner surface of the bottom plate portion 35 in the axial direction, and therefore no thrusting force is applied. In addition, a contact area between the outer peripheral surface of the inner diameter side cylinder portion 28a and the inner peripheral surface of the cylinder portion 12a of the cover 5a is large, and a frictional force acting the contact portion between both peripheral surfaces is increased. Hence, the holding ring 27c is hard to displace from the cover 5a. As a result, even though the state measuring apparatus for the rolling bearing unit is employed for a long term in the environment in which a change in temperature is remarkable, displacement of the sensor 6 being held by the sensor holder 7b in the axial direction can be prevented, and the highly reliable status variable measurement can be made.

Then, the effect of preventing such a situation that the sensor holder 7b is displaced with respect to the cover 5a in the rotating direction can be achieved by the engagement obtained between the notches 37, 37 formed at the top end edge of the folded set wall portion 36 and the synthetic resin constituting the sensor holder 7b. That is, the displacement of the sensor holder 7b from the cover 5a in the rotating direction can be eliminated by solidifying the synthetic resin in the notches 37, 37. As a result, like the second example of the embodiment shown in FIGS. 5 and 6, there is no necessity to form the engaging concave portion in the holding rings 27a, 27b.

The configurations and the actions of remaining portions are similar to those in the case of the above third example of the embodiment, and therefore illustration and explanation of the equivalent portions will be omitted herein.

Fourth Example of Embodiment

Figure 10:
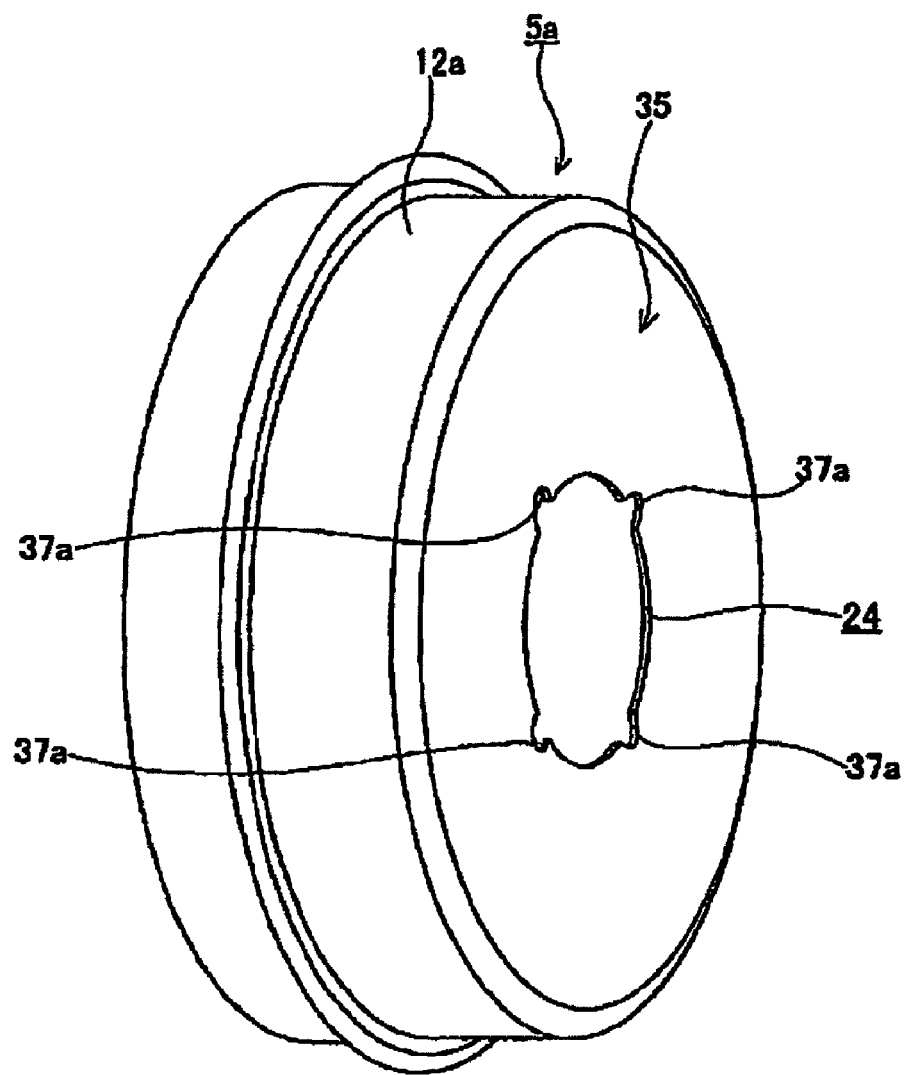
FIG. 10 A perspective view showing a cover showing a fourth example of the embodiment of the present invention.

FIG. 10 shows a fourth example of the embodiment of the present invention. In the case of this example, notches 37a, 37a are formed directly on the inner peripheral edge of the through hole 24 that is formed in the center portion of the bottom plate portion 35 of the cover 5a. These notches 37a, 37a are engaged with the synthetic resin constituting the sensor holder 7b when the sensor holder 7b (see FIG. 7) is formed by the injection molding. Hence, such an event can be prevented that the sensor holder 7b is displaced with respect to the cover 5a in the rotating direction. In the case of this example, the notches 37a, 37a correspond to a noncircular-shaped portion respectively.

The configurations and the actions of remaining portions are similar to those in the case of the above third example of the embodiment, and therefore illustration and explanation of the equivalent portions will be omitted herein.

Fifth Example of Embodiment

Figure 11:
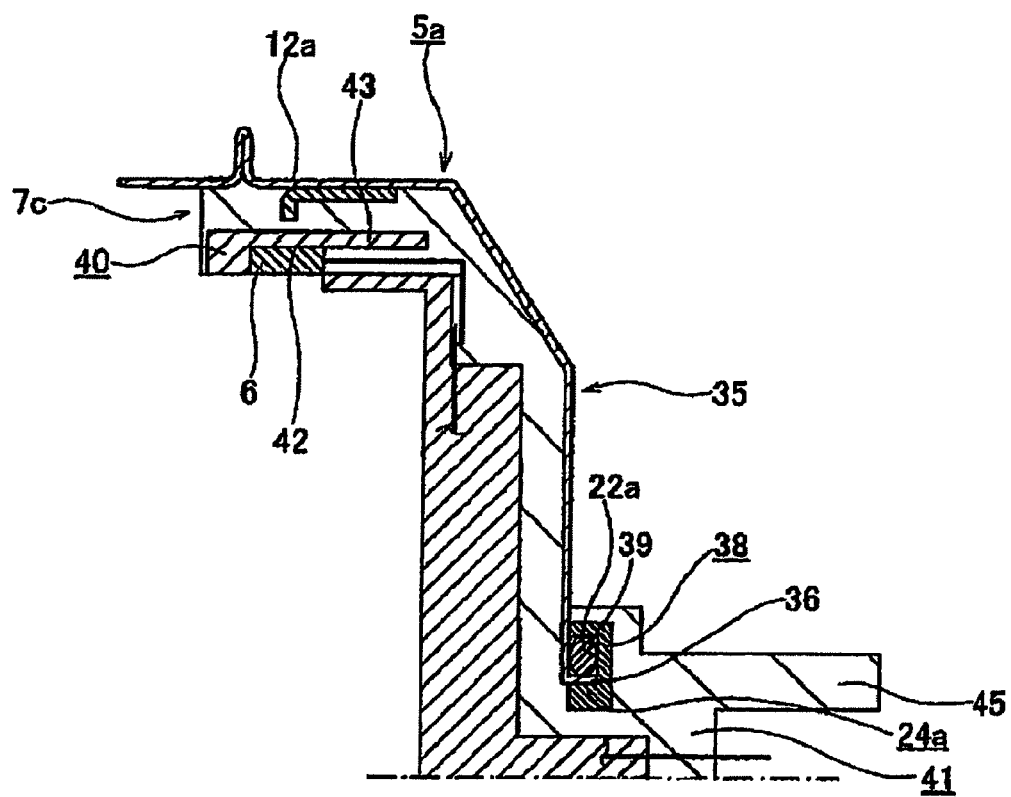
FIG. 11 A half sectional view showing a sensor holder that is holding a sensor and a cover, which shows a fifth example of the embodiment of the present invention.
Figure 12:
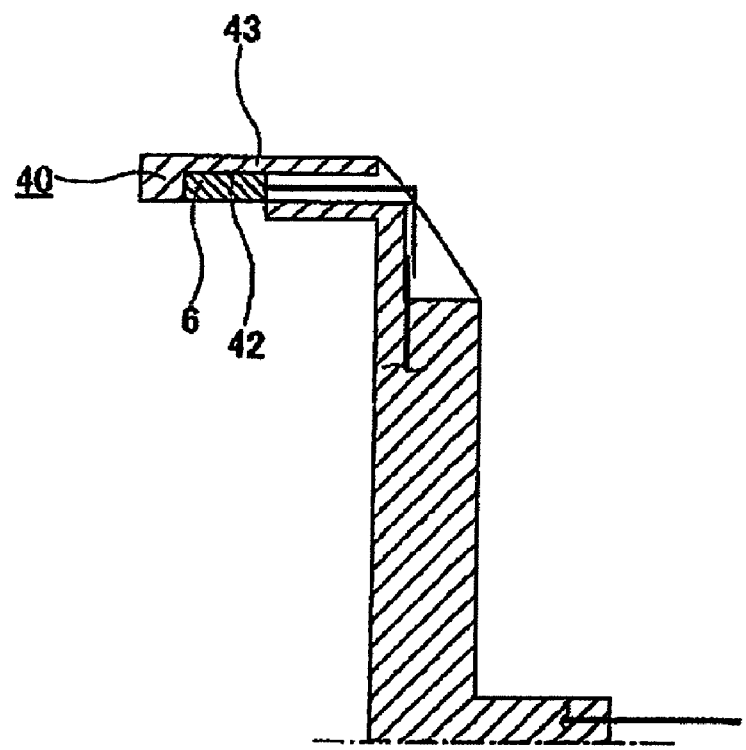
FIG. 12 A half sectional view showing a preforming portion and a sensor.
Figure 13:
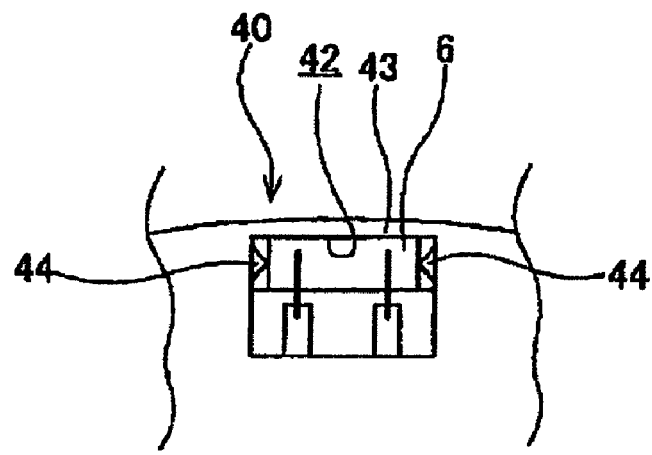
FIG. 13 A view showing a top portion in FIG. 12 when viewed from the rightward direction.
Figure 14:
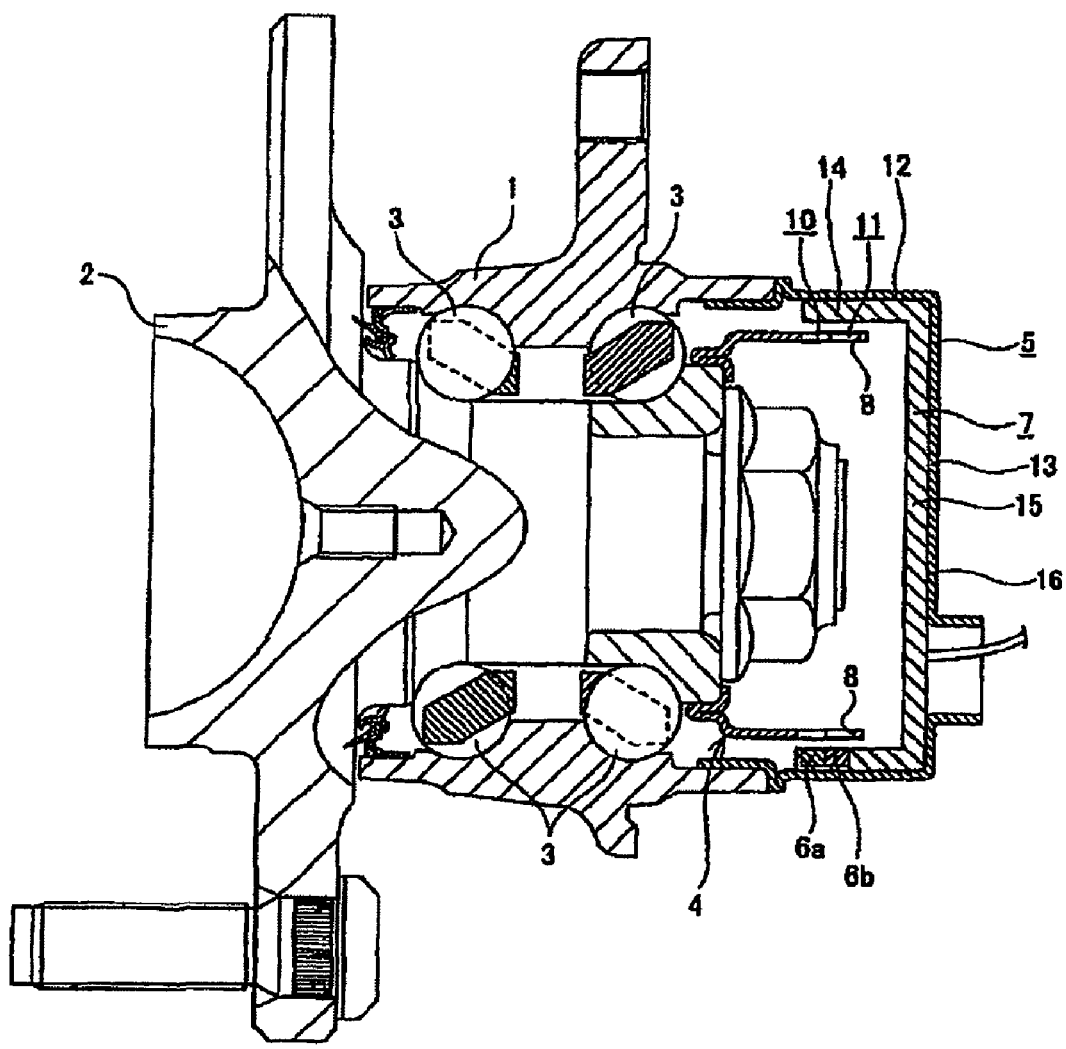
FIG. 14 A sectional view showing a first example of the conventional structure.
Figure 15:
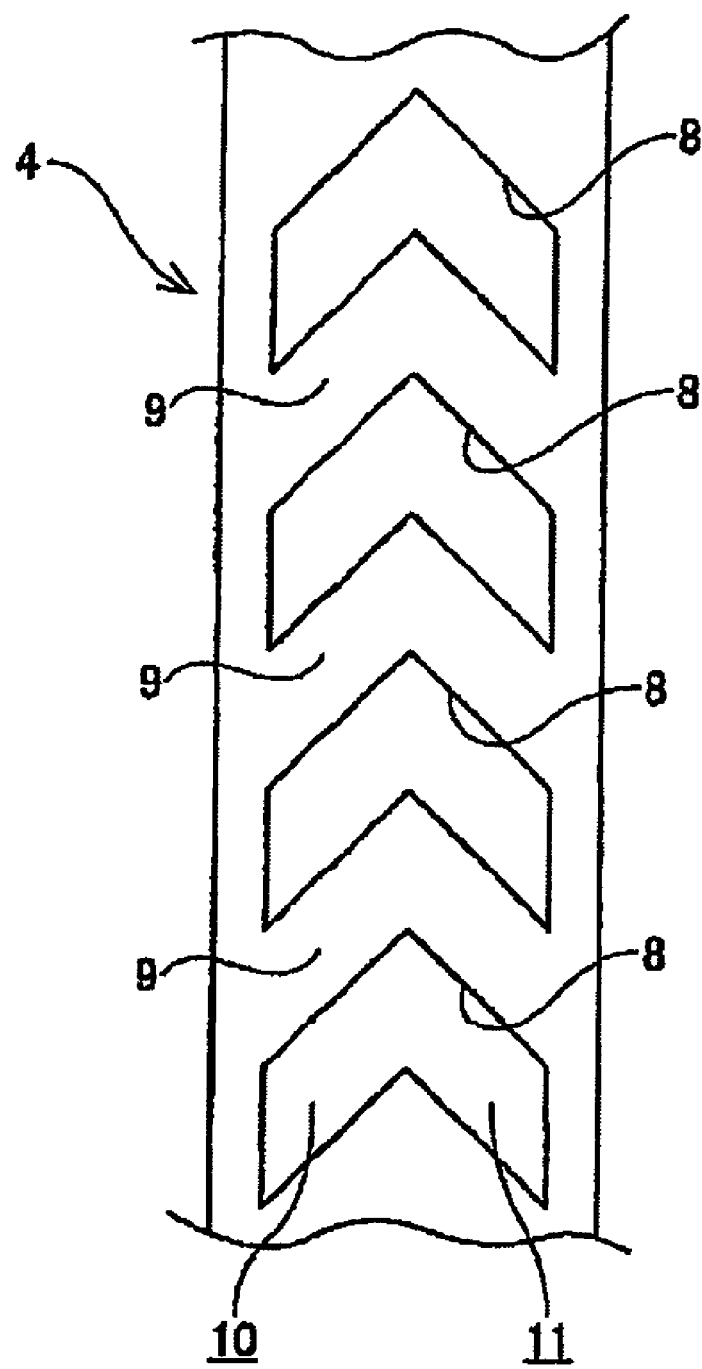
FIG. 15 A view showing a part of an encoder incorporated into this first example, when viewed from the radial direction.
Figure 16A:
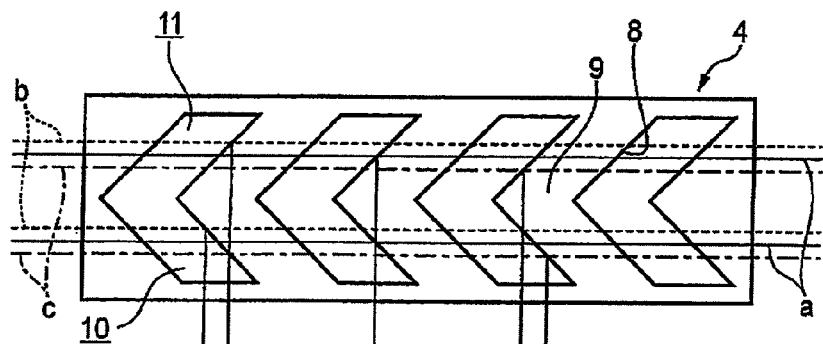
FIG. 16 Diagrams explaining such a status that output signals of a pair of sensors are changed according to an axial load.
Figure 16B:
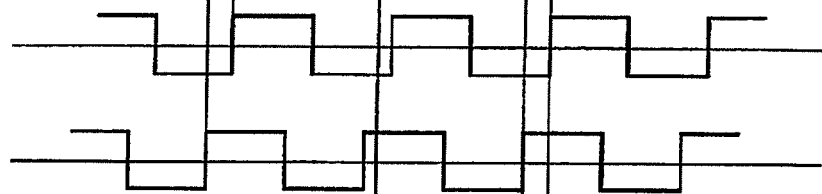
Figure 16C:
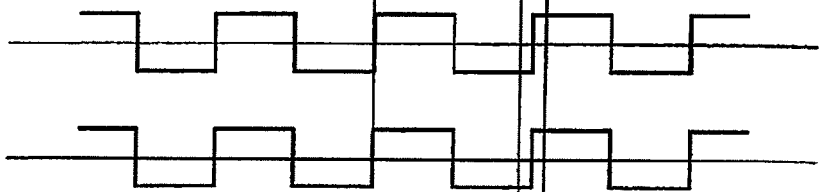
Figure 16D:
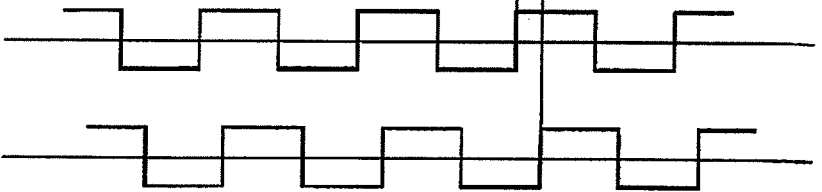

FIGS. 11 to 13 show a fifth example of the embodiment of the present invention. In the case of this example, a feature resides in a structure of the portion that ensures the water-tightness between the cover 5a made of metal and a sensor holder 7c made of synthetic resin and a structure of the portion that holds the sensor 6 in the sensor holder 7c.

First, as shown in FIG. 11, the water-tightness between the cover 5a and the sensor holder 7c can be achieved by an O ring 22a. This O ring 22a is provided on the side surface, which is located on the opposite side to the internal space into which the sensor 6 is fitted, out of both side surfaces of the cover 5a in the axial direction. For this purpose, in the case of this example, the O ring 22a is held in an O ring holder 38. This O ring holder 38 has a sectional shape that is shaped into a U-shape whose bottom plate portion 35 side of the cover 5a is opened, and is shaped into an annular ring as a whole. Also, the folded set wall portion 36 that is formed on the surrounding portion of the through hole 24a in the center portion of the bottom plate portion 35 is inserted into a holding groove 39 of the O ring holder 38 on the inner diameter side of the O ring holder 38. In this status, the O-ring 22a is compressed elastically over the whole circumference between a bottom surface of the holding groove 39 and the bottom plate portion 35. In this case, the folded set wall portion 36 is fitted into the inner diameter side peripheral wall of the holding groove 39 in terms of the tight fit such that its elastically compressed status can be still maintained even when a postforming portion 41 described later is formed by the injection molding. Also, the O ring holder 38 together with the O ring 22a is embedded in the synthetic resin constituting the sensor holder 7c.

In the case of this example, the sensor holder 7c is constructed by a preforming portion 40 used to hold the sensor 6, and the postforming portion 41 equipped with a connector portion 45. A plug provided to an end portion of the harness that fetch the sensed signal of the sensor 6 is connected to this connector portion 45. This preforming portion 40 is formed before the sensor holder 7c is fitted to the cover 5a, and has a holding hole 42 for holding the sensor 6. This holding hole 42 is provided in a part (one or plural locations) of a cylinder portion 43 in the circumferential direction, and is opened to the inner peripheral surface of the cylinder portion 43 and the inner end surface in the axial direction respectively. This cylinder portion 43 is formed on the outer peripheral edge portion of the preforming portion 40 over the whole circumference. Also, a pair of holding convex portions 44, 44 are formed on both inner side surfaces out of the inner surface of the holding hole 42 in the circumferential direction to project in the direction along which they comes close to each other. An interval between top end edges of both holding convex portions 44, 44 in a free status is set smaller than a width dimension of the sensor 6 in the circumferential direction. The sensor 6 is held in a predetermined position of the preforming portion 40 by inserting the holding convex portions 44, 44 into the holding hole 42 while expanding elastically the interval between the top end edges.

The preforming portion 40 and the sensor 6 are combined mutually previously (before the postforming portion 41 is formed by the injection molding) as shown in FIGS. 12 to 13. Then, after such combination, the cover 5a, which is combined with the O ring holder 38 and the O-ring 22a, and the postforming portion 41 are set in the cavity of the die to which the injection molding is applied. Then, the postforming portion 41 is formed by the injection molding while feeding the fused resin into the cavity. The sensor 6 that is temporarily held in the holding hole 42 is firmly fixed to the sensor holder 7c. In this event, it is preferable that all the synthetic resin constituting the postforming portion 41, the synthetic resin constituting the preforming portion 40, and the synthetic resin constituting the O ring holder 38 should be formed of the same type synthetic resin such that the postforming portion 41, the preforming portion 40, and the O ring holder 38 can be fused without boundary according to the injection molding of the postforming portion 41.

According to the structure of this example having such configuration, a breakage prevention of the joined portion between the sensor holder 7c and the cover 5a, a facilitation of the positioning of the sensor 6a with respect to the sensor holder 7c, and an improvement of the positioning accuracy can be achieved.

First, since the O ring 22a used to ensure the water-tightness between the sensor holder 7c and the cover 5a is provided to the internal space and the opposite side surface side, the breakage prevention of the joined portion can be achieved. That is, since the O ring 22a is provided to the portion that is close to the external space where a moisture such as a rainwater, or the like exists, an amount of moisture that sinks into a clearance between the sensor holder 7c and the cover 5a by a surface tension can be reduced. Then, the breakage prevention of the joined portion between the sensor holder 7c and the cover 5a can be easily attained in a state that this moisture freezes.

Also, improvements of the facilitation of the positioning and the positioning accuracy can be attained by forming the postforming portion 41 by means of the injection molding in a state that the sensor 6 is temporarily held in the holding hole 42 of the preforming portion 40 by a pair of holding convex portions 44, 44. Also, reliability and a cost reduction of the state measuring apparatus for the rolling bearing unit can be improved by achieving improvements of the facilitation of the positioning and the positioning accuracy.

In this case, the present invention is not limited to the structures of the above-mentioned embodiments, and a variation and an improvement can be applied appropriately.

Figure 25:
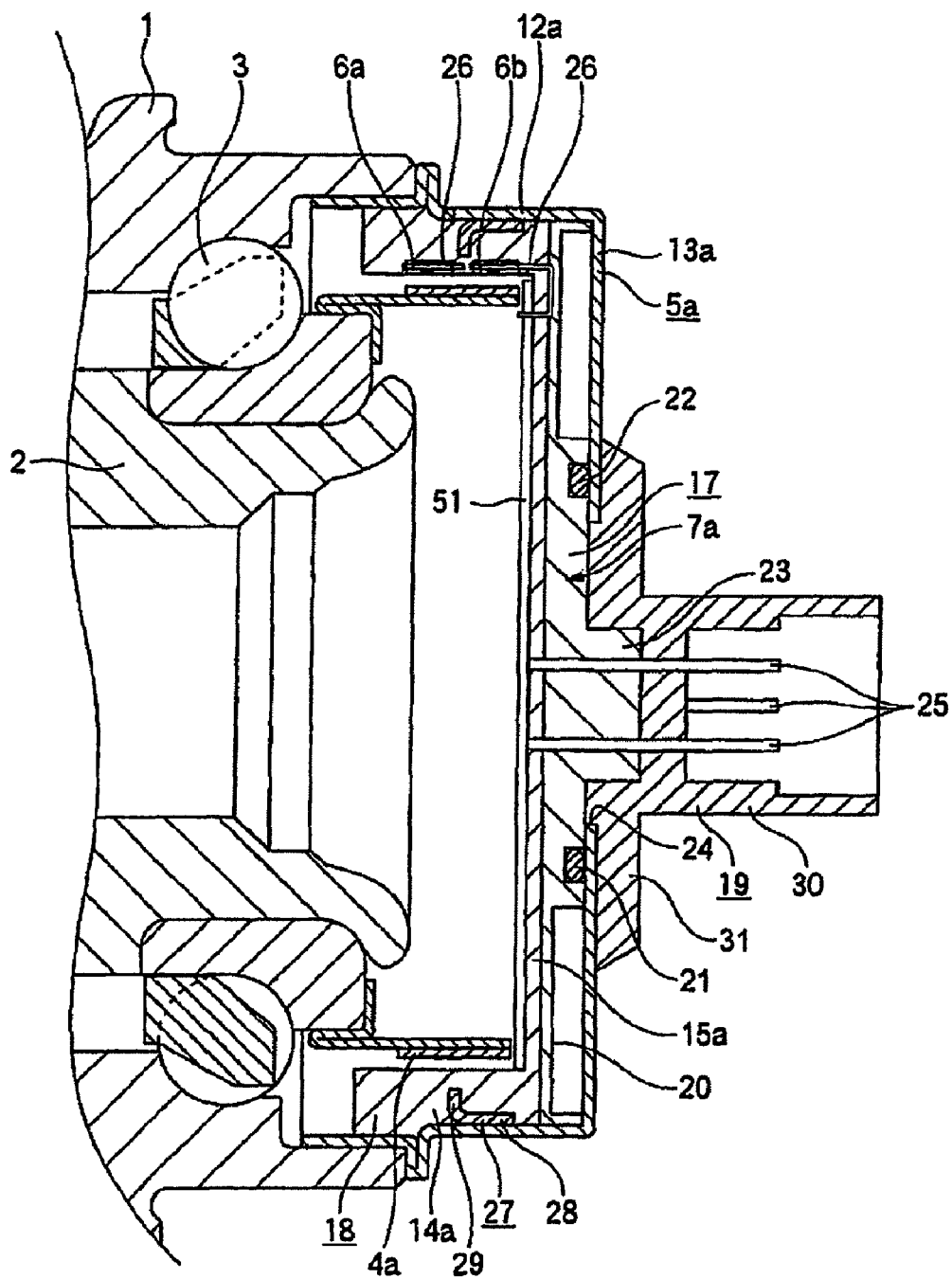
FIG. 25 A pertinent sectional view showing a variation of a calculator.

For example, the calculator of the present invention is not limited to the calculator provided on the outside as shown in FIG. 1, and the structure arranged in the rolling bearing unit may be employed. Concretely, as shown in FIG. 25, a calculator 51 is fixed to a surface of the bottom plate portion 15a of the main holder portion 18 on the hub side, and the conductors 26 are connected to respective terminals 25. Then, the signals from the conductors 26 are processed by the calculator 51, and the calculated result may be output from respective terminals 25.

INDUSTRIAL APPLICABILITY

Figure 18:
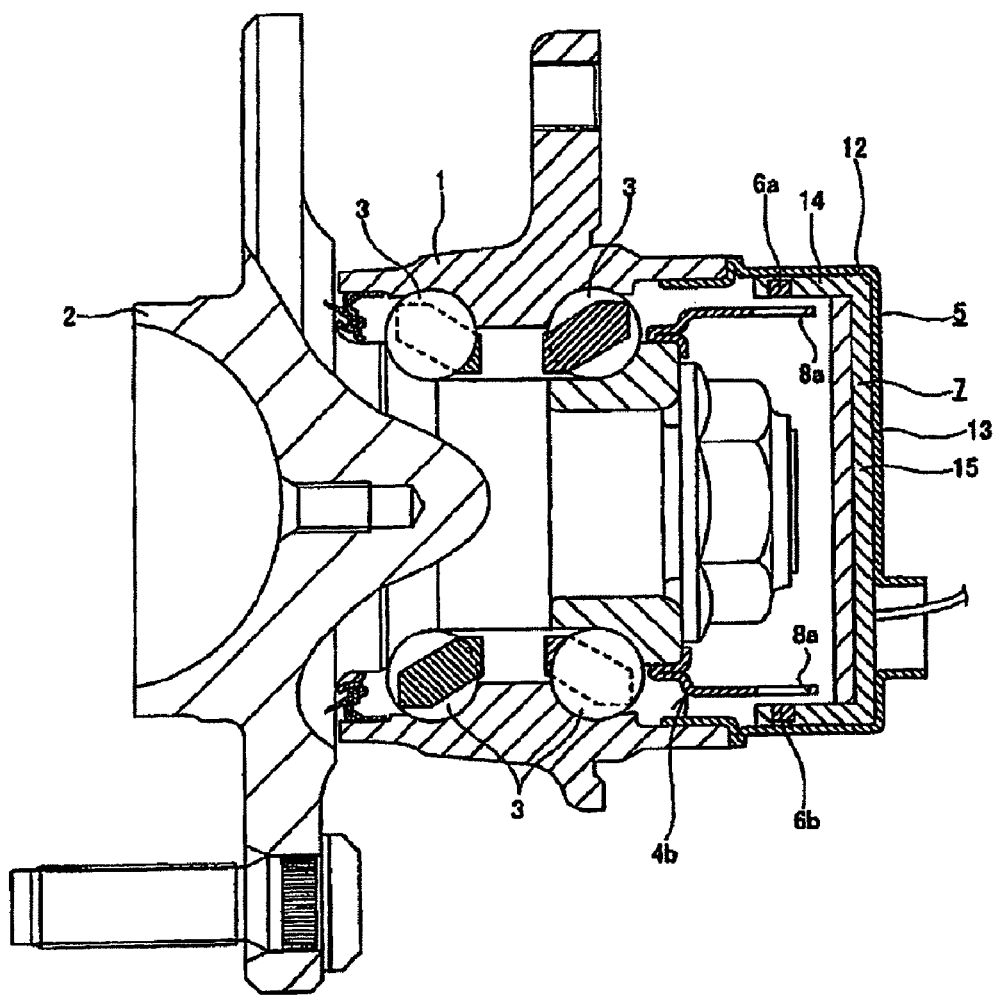
FIG. 18 A sectional view showing a second example of the conventional structure.
Figure 19:
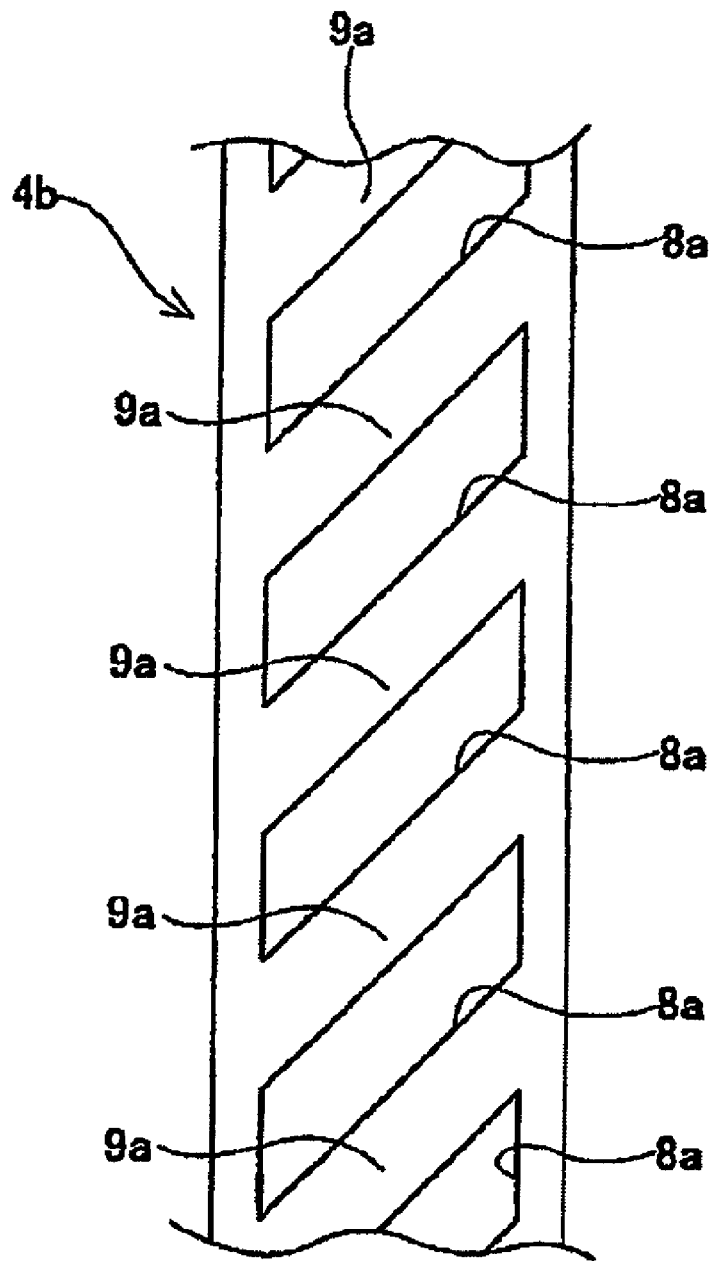
FIG. 19 A view showing a part of an encoder incorporated into this third example, when viewed from the radial direction.
Figure 20:
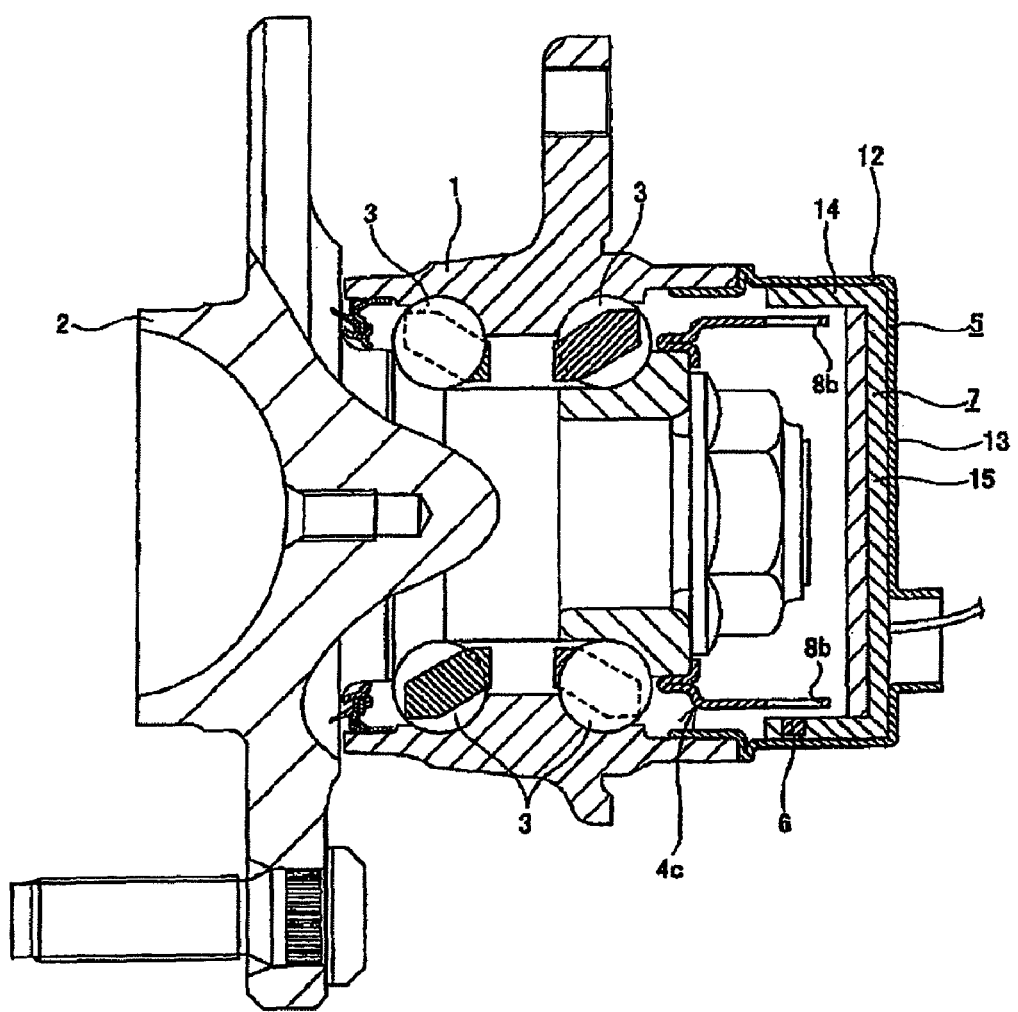
FIG. 20 A sectional view showing a fourth example of the conventional structure.
Figure 21:
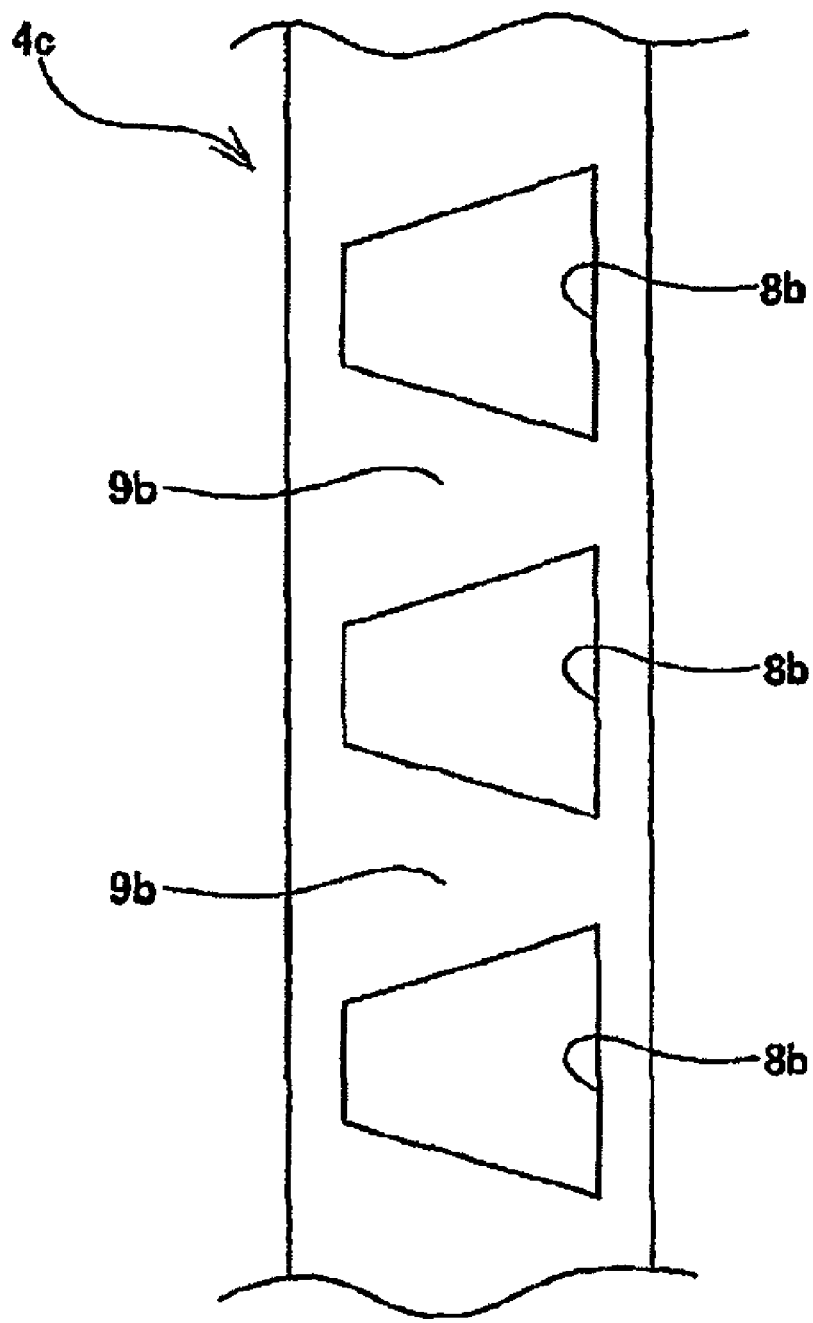
FIG. 21 A view showing a part of an encoder incorporated into this fourth example, when viewed from the radial direction.
Figure 22A:
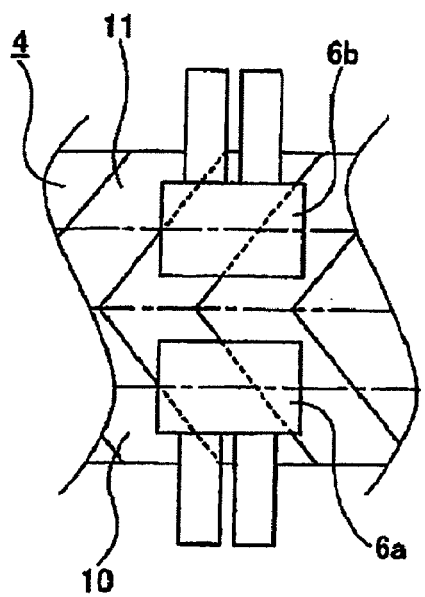
FIG. 22 A view showing such a situation that a pair of sensors are displaced in an axial direction according to a temperature change in the conventional structure, when viewed from the outside in the radial direction.
Figure 22B:
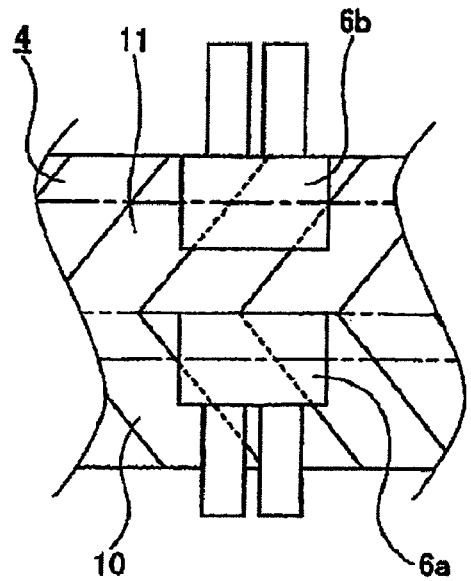
Figure 23A:
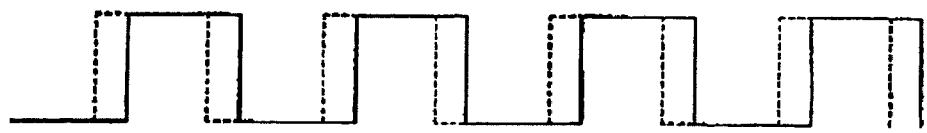
FIG. 23 A diagram showing such a situation that phases of output signals of a pair of sensors are changed according to a temperature change.
Figure 23B:
Figure 24:
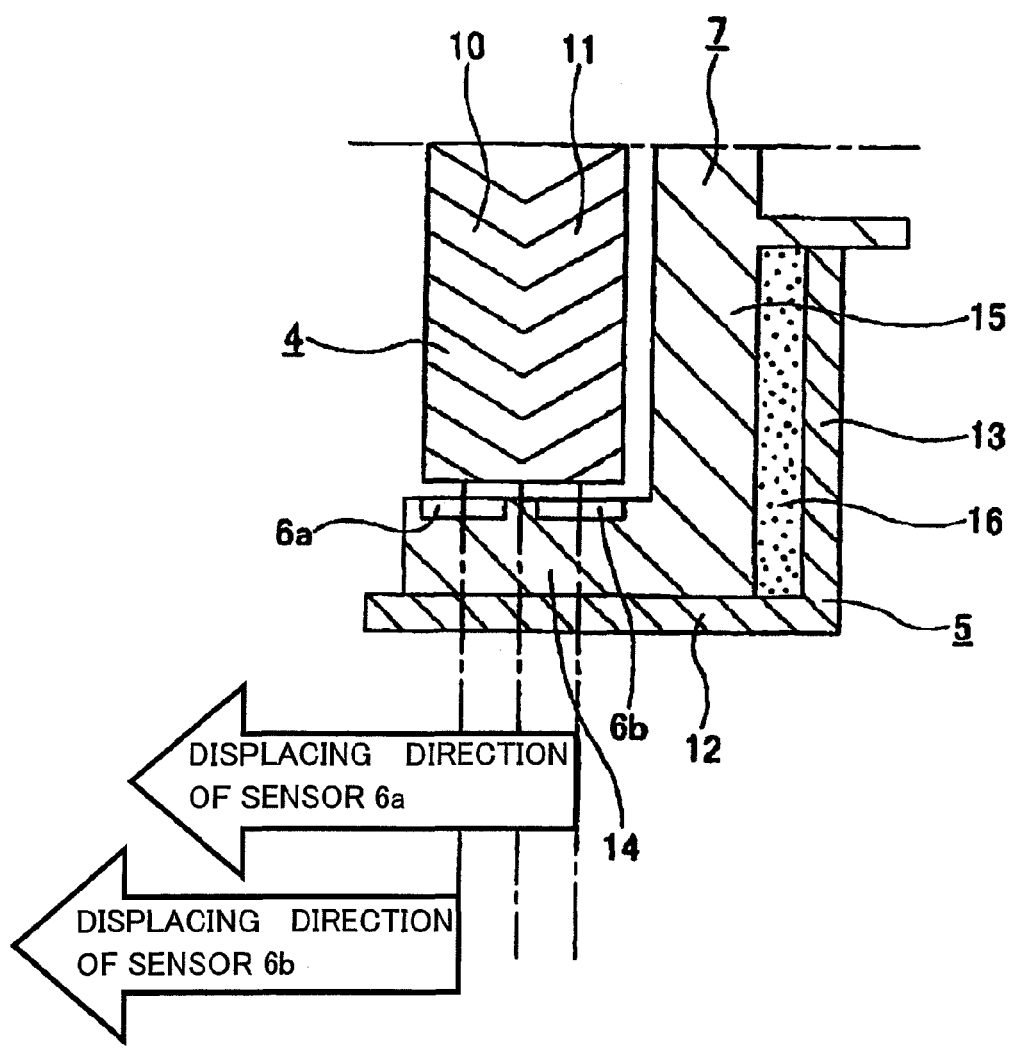
FIG. 24 A view showing such a situation that a pair of sensors are displaced in an axial direction according to a temperature change in the conventional structure, when viewed from the side.

The present invention can be applied to various structures other than the structure that detects an amount of relative displacement or the axial load in the axial direction, based on the phase difference between the output signals of a pair of sensors that are arranged separately in the axial direction. For example, as shown in above FIGS. 18 and 19, the present invention can be applied to the structure that detects a moment or an axial load, based upon the phase difference between the output signals produced by inclinations of encoders of a pair of sensors that are arranged at two locations on the opposite side in the radial direction. Also, as shown in above FIGS. 20 and 21, the present invention can be applied to the structure that detects an amount of relative displacement or an axial load in the axial direction, based on a duty ratio of an output signal of one sensor. Also, it is of course that the illustrated embodiments can be applied by appropriately combining them mutually, and can be applied by picking up a part of the structures of the embodiments.

This application is based upon Japanese Patent Application (Patent Application No. 2007-136236) filed on May 23, 2007, Japanese Patent Application (Patent Application No. 2007-

290888) filed on Nov. 8, 2007, and Japanese Patent Application (Patent Application No. 2008-121269) filed on May 7, 2008; the contents of which are incorporated herein by reference.

The invention claimed is:

1. A state measuring apparatus for a rolling bearing unit, the device comprising:
   a rolling bearing unit equipped with an outer ring that has double row outer ring raceways on an inner peripheral surface and is not rotated in use, a hub that has double row inner ring raceways on an outer peripheral surface and is rotated in use, and a rolling element that is provided rotatably in plural in each row between the double row inner ring raceways and the double row outer ring raceways; and
   a state measuring apparatus equipped with an encoder, at least one sensor, and a calculating unit;
   wherein the encoder is attached to an end portion of the hub concentrically with the hub and has a cylindrical sensed surface concentrically with the hub, a characteristic of which being changed alternately with respect to a circumferential direction,
   wherein the sensor is held in a cylindrical cover, which is made of metal and with bottom and fixed to the end portion such that an end portion opening of the outer ring is covered in a state that a sensing portion is opposed to the sensed surface of the encoder via a sensor holder made of synthetic resin and changes an output signal in response to a change in the characteristic of the sensed surface,
   wherein the calculating unit has a function of calculating at least one status variable of a relative displacement between the outer ring and the hub and an external force applied between the outer ring and the hub, based on the output signal of the sensor, and
   wherein the sensor holder has an annular portion that holds at least the sensor, and is attached to the cylindrical portion via a holding ring in a state that the holding ring fixed to an inner peripheral surface of a cylinder portion constituting the cover is embedded in an intermediate portion of the annular portion in the axial direction.

2. The state measuring apparatus for the rolling bearing unit according to claim 1,
   wherein a plurality of sensors are provided in mutually different positions in the axial direction on an inner diameter side of the cylinder portion constituting the cover, and
   wherein a position in which the holding ring is embedded in the annular portion of the sensor holder in the axial direction corresponds to a center position between sensing portions of the sensors.

3. The state measuring apparatus for the rolling bearing unit according to claim 2,
   wherein a clearance portion exists between the annular portion of the sensor holder and a bottom plate portion of the cover.

4. The state measuring apparatus for the rolling bearing unit according to claim 2,
   wherein the holding ring has an inner diameter side cylinder portion, and a folded portion folded inwardly in a radial direction from one end edge of the inner diameter side cylinder portion,
   wherein the inner diameter side cylinder portion is securely fitted in the cylinder portion of the cover by means of tight fit in a state that other end edge in the axial direction pushed against an inner surface of the bottom plate portion constituting the cover, and
   wherein a position of the folded portion in the axial direction coincides with a center position between the sensing portions of a plurality of sensors or a position of the sensing portion of the sensor in the axial direction in a state that the inner diameter side cylinder portion is fixed.

5. The state measuring apparatus for the rolling bearing unit according to claim 2,
   wherein a situation that the sensor holder is rotated with respect to the holding ring is prevented by engaging a convex portion of the sensor holder and concave portions provided in a part of the holding ring made of a metal plate.

6. The state measuring apparatus for the rolling bearing unit according to claim 1,
   wherein a sensing portion of at least one sensor is opposed to the sensed surface of the encoder in a same position in the axial direction, and
   wherein a position in which the holding ring is embedded in the annular portion of the sensor holder in the axial direction coincides with a position of the sensing portion of the sensor in the axial direction.

7. The state measuring apparatus for the rolling bearing unit according to claim 6,
   wherein a clearance portion exists between the annular portion of the sensor holder and a bottom plate portion of the cover.

8. The state measuring apparatus for the rolling bearing unit according to claim 6,
   wherein the holding ring has an inner diameter side cylinder portion, and a folded portion folded inwardly in a radial direction from one end edge of the inner diameter side cylinder portion,
   wherein the inner diameter side cylinder portion is securely fitted in the cylinder portion of the cover by means of tight fit in a state that other end edge in the axial direction pushed against an inner surface of the bottom plate portion constituting the cover, and
   wherein a position of the folded portion in the axial direction coincides with a center position between the sensing portions of a plurality of sensors or a position of the sensing portion of the sensor in the axial direction in a state that the inner diameter side cylinder portion is fixed.

9. The state measuring apparatus for the rolling bearing unit according to claim 6,
   wherein a situation that the sensor holder is rotated with respect to the holding ring is prevented by engaging a convex portion of the sensor holder and concave portions provided in a part of the holding ring made of a metal plate.

10. The state measuring apparatus for the rolling bearing unit according to claim 1,
    wherein a clearance portion exists between the annular portion of the sensor holder and a bottom plate portion of the cover.

11. The state measuring apparatus for the rolling bearing unit according to claim 10,
    wherein the holding ring has an inner diameter side cylinder portion, and a folded portion folded inwardly in a radial direction from one end edge of the inner diameter side cylinder portion,
    wherein the inner diameter side cylinder portion is securely fitted in the cylinder portion of the cover by means of tight fit in a state that other end edge in the axial direction pushed against an inner surface of the bottom plate portion constituting the cover, and wherein a position of the folded portion in the axial direction coincides with a center position between the sensing portions of a plurality of sensors or a position of the sensing portion of the sensor in the axial direction in a state that the inner diameter side cylinder portion is fixed.

12. The state measuring apparatus for the rolling bearing unit according to claim 10,
wherein a situation that the sensor holder is rotated with respect to the holding ring is prevented by engaging a convex portion of the sensor holder and concave portions provided in a part of the holding ring made of a metal plate.

13. The state measuring apparatus for the rolling bearing unit according to claim 1,
wherein the holding ring has an inner diameter side cylinder portion, and a folded portion folded inwardly in a radial direction from one end edge of the inner diameter side cylinder portion,
wherein the inner diameter side cylinder portion is securely fitted in the cylinder portion of the cover by means of tight fit in a state that other end edge in the axial direction pushed against an inner surface of the bottom plate portion constituting the cover, and
wherein a position of the folded portion in the axial direction coincides with a center position between the sensing portions of a plurality of sensors or a position of the sensing portion of the sensor in the axial direction in a state that the inner diameter side cylinder portion is fixed.

14. The state measuring apparatus for the rolling bearing unit according to claim 13,
wherein a situation that the sensor holder is rotated with respect to the holding ring is prevented by engaging a convex portion of the sensor holder and concave portions provided in a part of the holding ring made of a metal plate.

15. The state measuring apparatus for the rolling bearing unit according to claim 1,
wherein a situation that the sensor holder is rotated with respect to the holding ring is prevented by engaging a convex portion of the sensor holder and concave portions provided in a part of the holding ring made of a metal plate.

16. The state measuring apparatus for the rolling bearing unit according to claim 1,
wherein the sensor holder is provided on both sides of the bottom plate portion constituting the cover,
wherein the both side portions are coupled mutually through a coupling portion existing in a through hole that is formed in a center portion of the bottom plate portion,
wherein a rotation of the sensor holder with respect to the cover is blocked in terms of an engagement between noncircular-shaped portions formed on a peripheral portion of the through hole and any portion of the sensor holder, and
wherein water-tightness between the sensor holder and the cover is ensured by an O ring that is provided between a surrounding portion of the through hole on a side surface, which is located on an opposite side to an internal space in which the sensor is provided, out of both side surfaces of the cover in the axial direction, and an engaging concave, which is formed in a portion of the sensor holder opposing to the surrounding portion.

17. A method of manufacturing a state measuring apparatus for a rolling bearing unit, the device comprising:
a rolling bearing unit equipped with an outer ring that has double row outer ring raceways on an inner peripheral surface and is not rotated in use, a hub that has double row inner ring raceways on an outer peripheral surface and is rotated in use, and a rolling element that is provided rotatably in plural in each row between the double row inner ring raceways and the double row outer ring raceways; and
a state measuring apparatus equipped with an encoder, at least one sensor, and a calculating unit,
wherein the encoder is attached to an end portion of the hub concentrically with the hub, and has a cylindrical sensed surface, a characteristic of which is changed alternately with respect to a circumferential direction, concentrically with the hub,
wherein the sensor is held in a cylindrical cover, which is made of metal and with bottom and is fixed to the end portion such that an end portion opening of the outer ring is blocked in a state that a sensing portion is opposed to the sensed surface of the encoder, via a sensor holder made of synthetic resin, and changes an output signal in response to change in characteristic of the sensed surface,
wherein the calculating unit has a function of calculating at least one status variable of a relative displacement between the outer ring and the hub and an external force applied between the outer ring and the hub, based on the output signal of the sensor,
wherein the sensor holder has an annular portion that holds at least the sensor, and is attached to the cylindrical portion via a holding ring embedded in the status that the holding ring fixed to the inner peripheral surface of the cylinder portion constituting the cover is embedded in the intermediate portion of an annular portion in the axial direction,
wherein a clearance portion exists between the annular portion of the sensor holder and a bottom plate portion of the cover, and
wherein the method comprising:
forming a circular disc-like terminal holder, which has an outer diameter that is fitted into an innermost end portion of the cover and in which an annular concave portion that is provided to a portion of one side surface portion located near the outer diameter in the axial direction to oppose to the bottom plate portion of the cover is formed, of the sensor holder by injecting a synthetic resin from an outside of the cover;
fitting the terminal into the innermost end portion;
securely fitting the holding ring into an intermediate portion of the cylinder portion constituting the cover in the axial direction; and
forming the annular portion, which holds the sensor, of the sensor holder on an inner diameter side of the cylinder portion by an injection molding in a state that the holding ring is embedded in the annular portion.

18. The method of manufacturing the state measuring apparatus for the rolling bearing unit according to claim 17,
wherein, when the terminal holder of the sensor holder is formed injecting the synthetic resin from the outside of the cover, a base end portion of the terminal used to fetch the output signal of the sensor is embedded in a portion of one side surface portion of the terminal holder, which is located near the inner diameter in the axial direction,
wherein a base end portion of the conductor used to coupling fix the sensor to the top end portion is embedded in a portion of other side surface portion of the terminal holder, which is located near the outer diameter in the axial direction, in a state that respective top end portions are protruded from the side surfaces of the holder in the axial direction, and wherein the annular portion, which holds the sensor, and the connector portion, into which a plug connected to the terminal is inserted, are formed by the injection molding to put the bottom plate portion and the terminal holder therebetween from both sides in the axial direction after the terminal holder is fitted into the innermost portion of the cover and also a top end portion of the terminal is protruded to an outside of the cover via the through hole formed in the bottom plate portion of the cover.

* * * * *